US012588656B2

(12) United States Patent
    Busbice

(10) Patent No.:     US 12,588,656 B2
(45) Date of Patent:      Mar. 31, 2026

(54) ANIMAL FEEDER SYSTEM

(71) Applicant: DEADFALL LLC, Peru, IL (US)

(72) Inventor: Matt Busbice, Baton Rouge, LA (US)

( * ) Notice: Subject to any disclaimer, the term of this patent is extended or adjusted under 35 U.S.C. 154(b) by 0 days.

(21) Appl. No.: 18/627,418

(22) Filed: Apr. 4, 2024

(65) Prior Publication Data

US 2024/0334900 A1      Oct. 10, 2024

Related U.S. Application Data

(60) Provisional application No. 63/494,068, filed on Apr. 4, 2023.

(51) Int. Cl.
    *A01K 5/02*       (2006.01)
(52) U.S. Cl.
    CPC .......... *A01K 5/0225* (2013.01); *A01K 5/0291* (2013.01)
(58) Field of Classification Search
    CPC .... A01K 5/0225; A01K 5/0291; A01K 5/025; A01K 29/005; A01K 39/00; A01M 29/24
    See application file for complete search history.

(56) References Cited

U.S. PATENT DOCUMENTS

| | | | | |
|---|---|---|---|---|
| 8,272,350 | B1 * | 9/2012 | England | ................. A01K 5/025 |
| | | | | 222/485 |
| 10,314,289 | B1 * | 6/2019 | Harding | ............... A01K 5/0225 |

| | | | | |
|---|---|---|---|---|
| 11,980,169 | B1 * | 5/2024 | Eppink | ................ A01K 5/0291 |
| 12,004,491 | B1 * | 6/2024 | Van Delden | ......... A01K 5/0291 |
| D1,069,261 | S * | 4/2025 | Meng | ........................... D30/129 |
| 2012/0037080 | A1 * | 2/2012 | Hepp | ................... A01K 39/012 |
| | | | | 119/51.01 |
| 2016/0227736 | A1 * | 8/2016 | Monk | ................... A01K 5/0142 |
| 2017/0273277 | A1 * | 9/2017 | Monk | ................. A01K 29/005 |
| 2021/0000071 | A1 | 1/2021 | Hill | |
| 2021/0204509 | A1 | 7/2021 | Staples et al. | |
| 2023/0189755 | A1 * | 6/2023 | Strobel | ................ A01K 5/0225 |
| | | | | 119/52.1 |

OTHER PUBLICATIONS

International Search Report and Written Opinion for PCT/US2023/011751 dated May 2, 2023 (16 pages).

* cited by examiner

*Primary Examiner* — Ebony E Evans
(74) *Attorney, Agent, or Firm* — Smith Keane LLP

(57) ABSTRACT

A feeder system has a reservoir holds feed, which is to be dispersed according to a desirable, preferred, animal, namely, a livestock animal (e.g., horse, cow, cattle, sheep, goats) and/or game animal (e.g., deer, elk, turkey). The feed contained in the reservoir is dispensed to at least one feed outlet chamber through a corresponding feed outlet in the housing. The inventive animal feeder system helps to prevent unscheduled feeding, water and/or moisture incursion, and access to feed by undesired animals. The present system further limits power draw, to improve deployment longevity of a feeder system, and offers a self-contained complete feeder system to prevent corrosion and unwanted disruption of electrical elements.

20 Claims, 24 Drawing Sheets

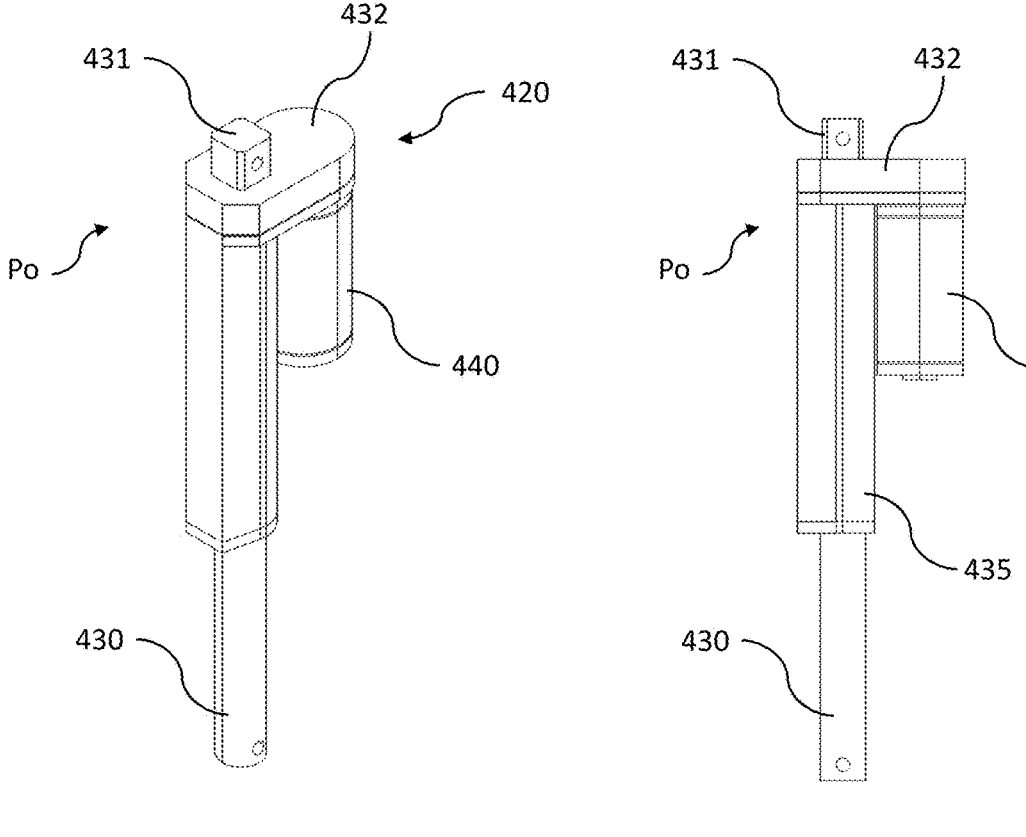
FIG. 9A                          FIG. 9B
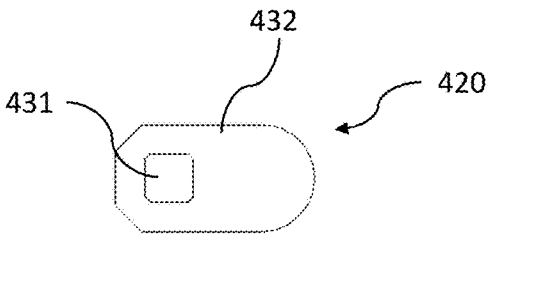
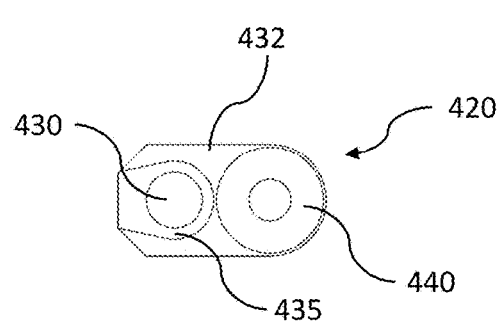
FIG. 9C                          FIG. 9D

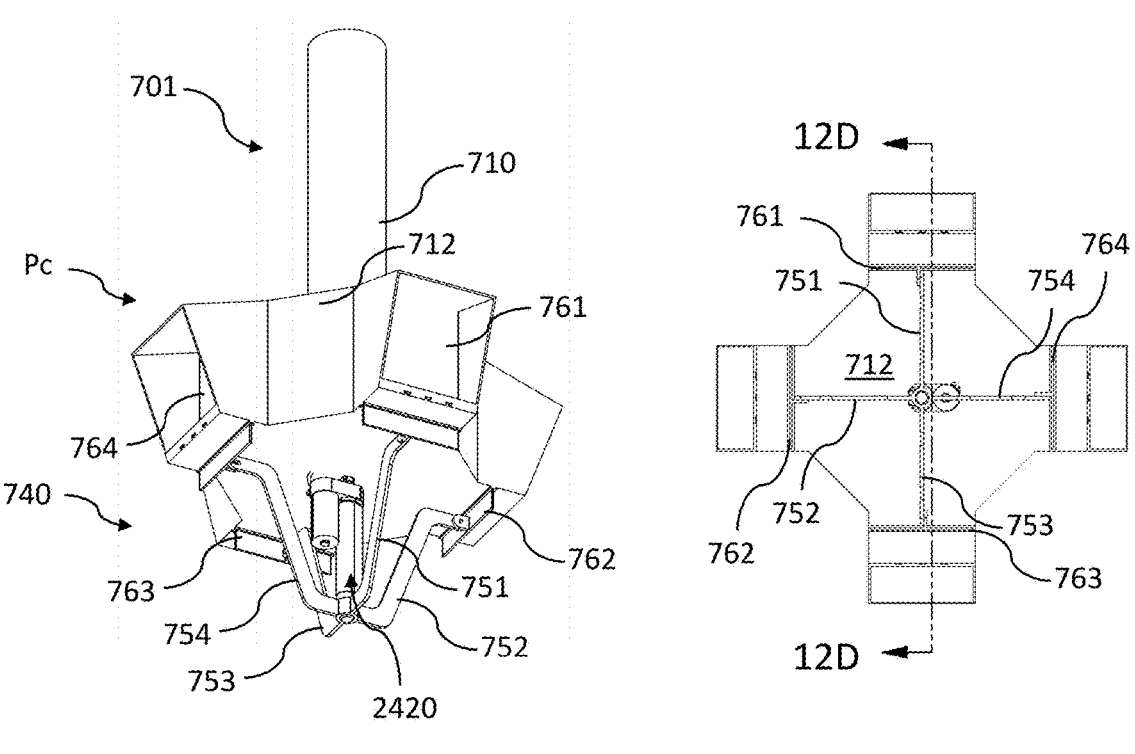
FIG. 13A
FIG. 13B
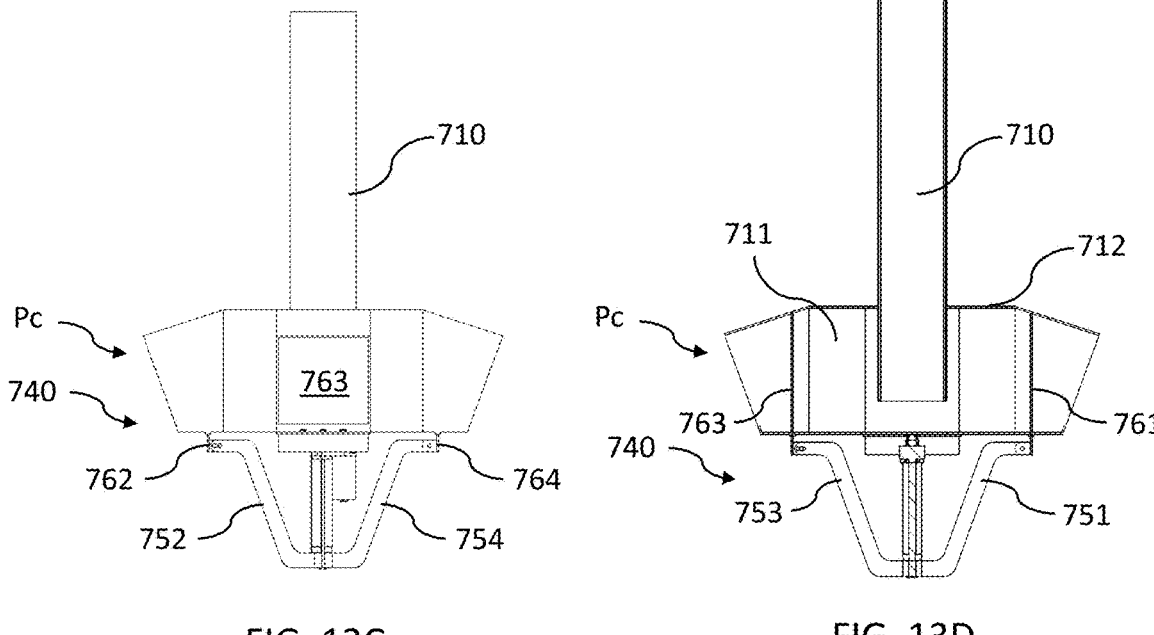
FIG. 13C
FIG. 13D

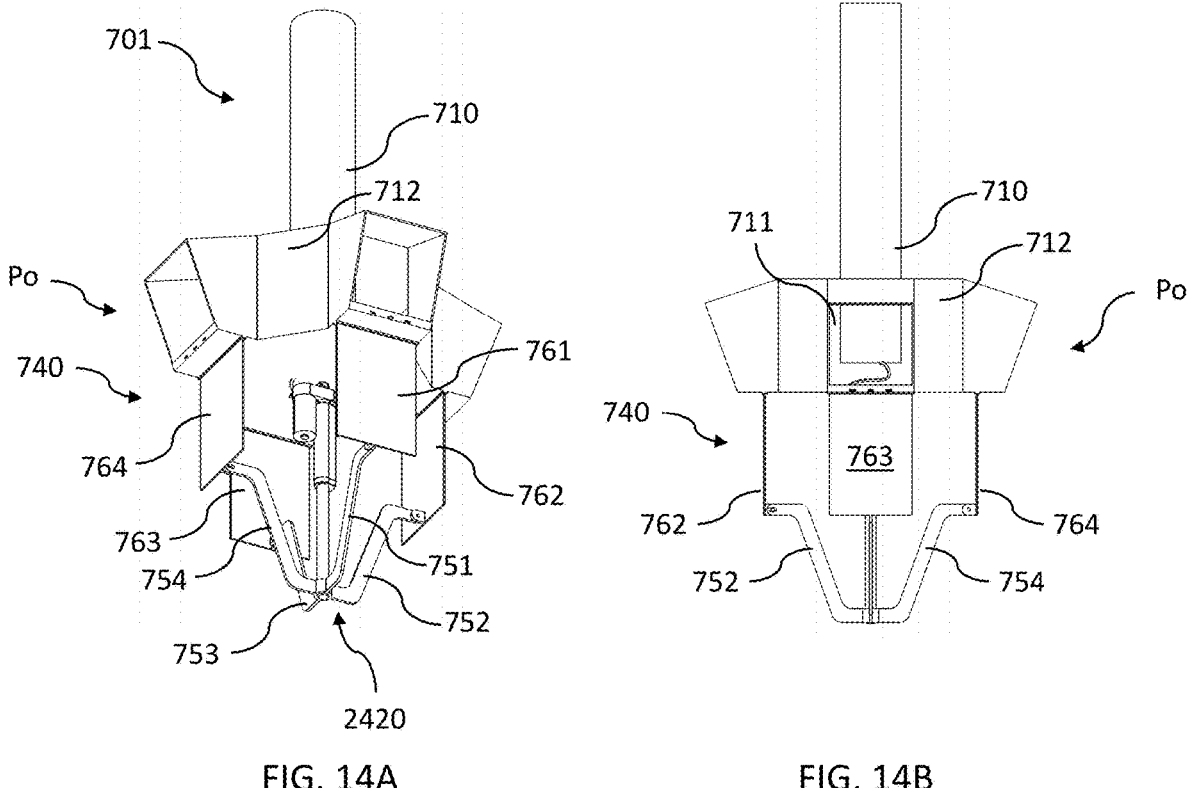
FIG. 14A                    FIG. 14B

ANIMAL FEEDER SYSTEM

CROSS-REFERENCE TO RELATED APPLICATIONS

This application claims priority to U.S. Provisional Application Ser. No. 63/494,068, wherein the disclosure of which is hereby incorporated by reference in its entirety for all purposes.

TECHNICAL FIELD

This disclosure relates to an animal feeder system for providing feed to animals, and in particular an animal feeder system having multiple feed outlet chambers and an actuator assembly for dispersing feed from a reservoir. According to at least some embodiments of the disclosure, an animal feeder system acts as a self-contained unit, wherein an actuator assembly is contained within a housing that further contains a feed reservoir. At least some embodiments of the disclosure detail a kit for attachment to existing feeding reservoir.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 9A is a perspective view of a linear actuator of the actuator assembly in the open position;

FIG. 9B is a side view of the linear actuator of FIG. 9A;

FIG. 9C is a top view of the linear actuator of FIG. 9A;

FIG. 9D is a bottom view of a linear actuator of FIG. 9A;

FIG. 13A is a lower perspective view of a second embodiment of an universal feeder system that is configured to be affixed to an existing reservoir, and wherein said universal feeder system includes a mounting flange, feed flow system, and feed distribution system, where the feed gates are in the closed position;

FIG. 13B is a bottom view of the universal feeder system of FIG. 13A;

FIG. 13C is a side view of the universal feeder system of FIG. 13A;

FIG. 13D is a cross-sectional view taken along line 13D-13D of FIG. 13B;

FIG. 14A is a lower perspective view of the universal feeder system of FIG. 13A, wherein the feed gates are in the open position; and FIG. 14B is a side view of the universal feeder system of FIG. 14A.

Figure 1A:
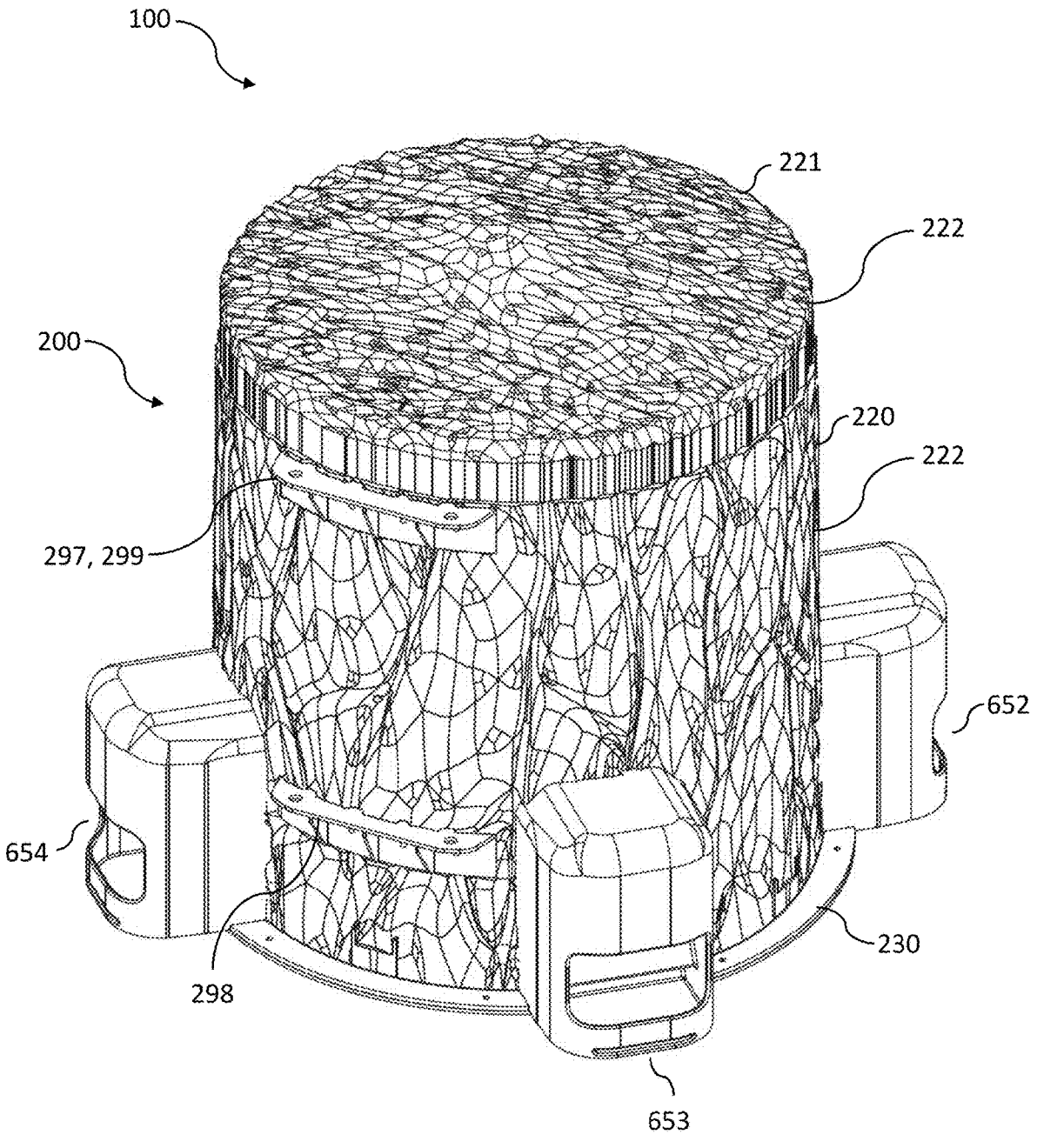
FIG. 1A is a perspective view of a first embodiment of a feeder system having: (i) a reservoir assembly with a housing, a lid, and a floor panel, (ii) an actuator assembly that is configured to open and close the plurality of controllable feed gates, and (iii) a plurality of feed outlet chambers coupled to said housing and positioned adjacent to the openable/closable feed gates.
Figure 1B:
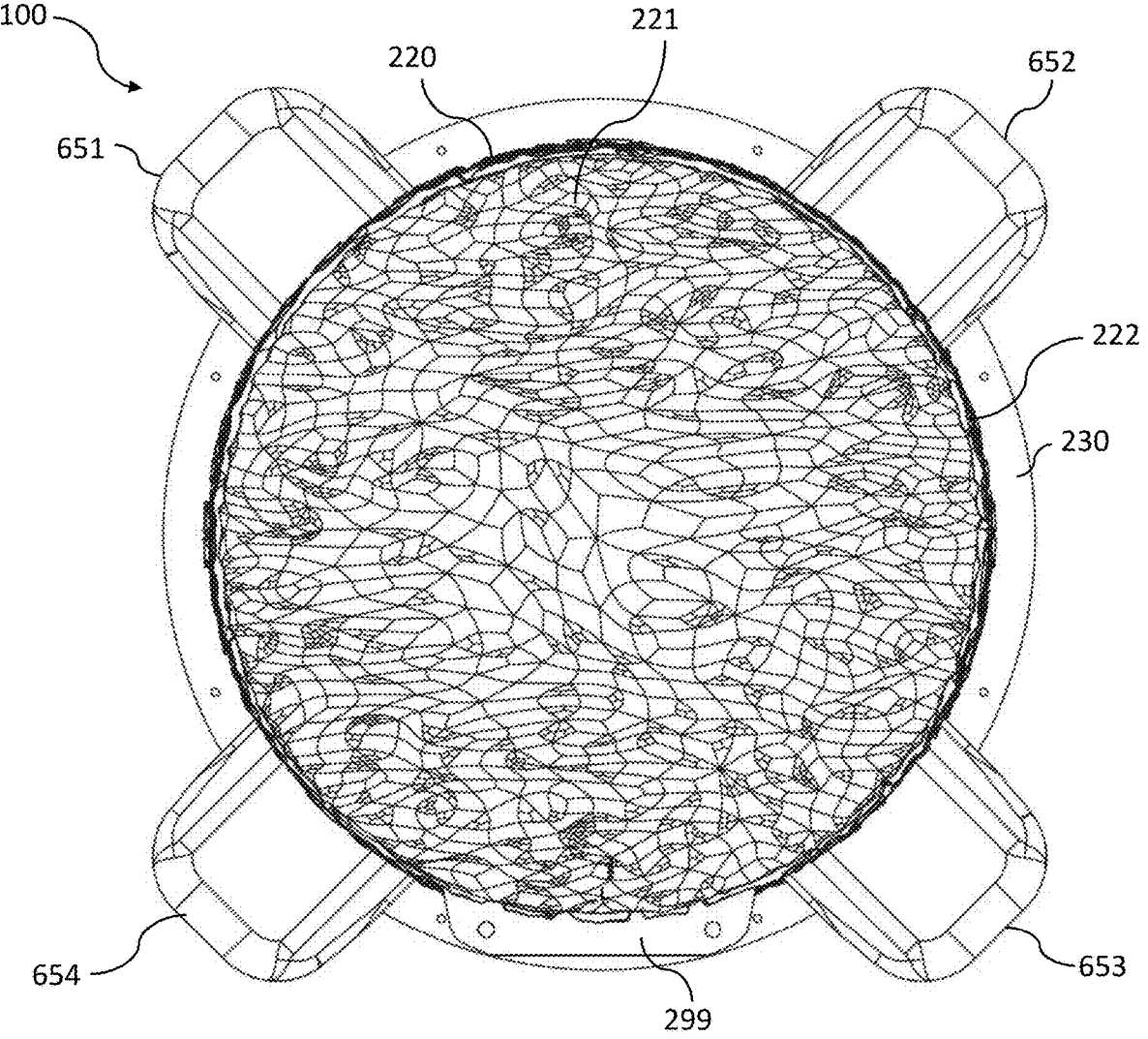
FIG. 1B is a top view of the feeder system of FIG. 1A.
Figure 1C:
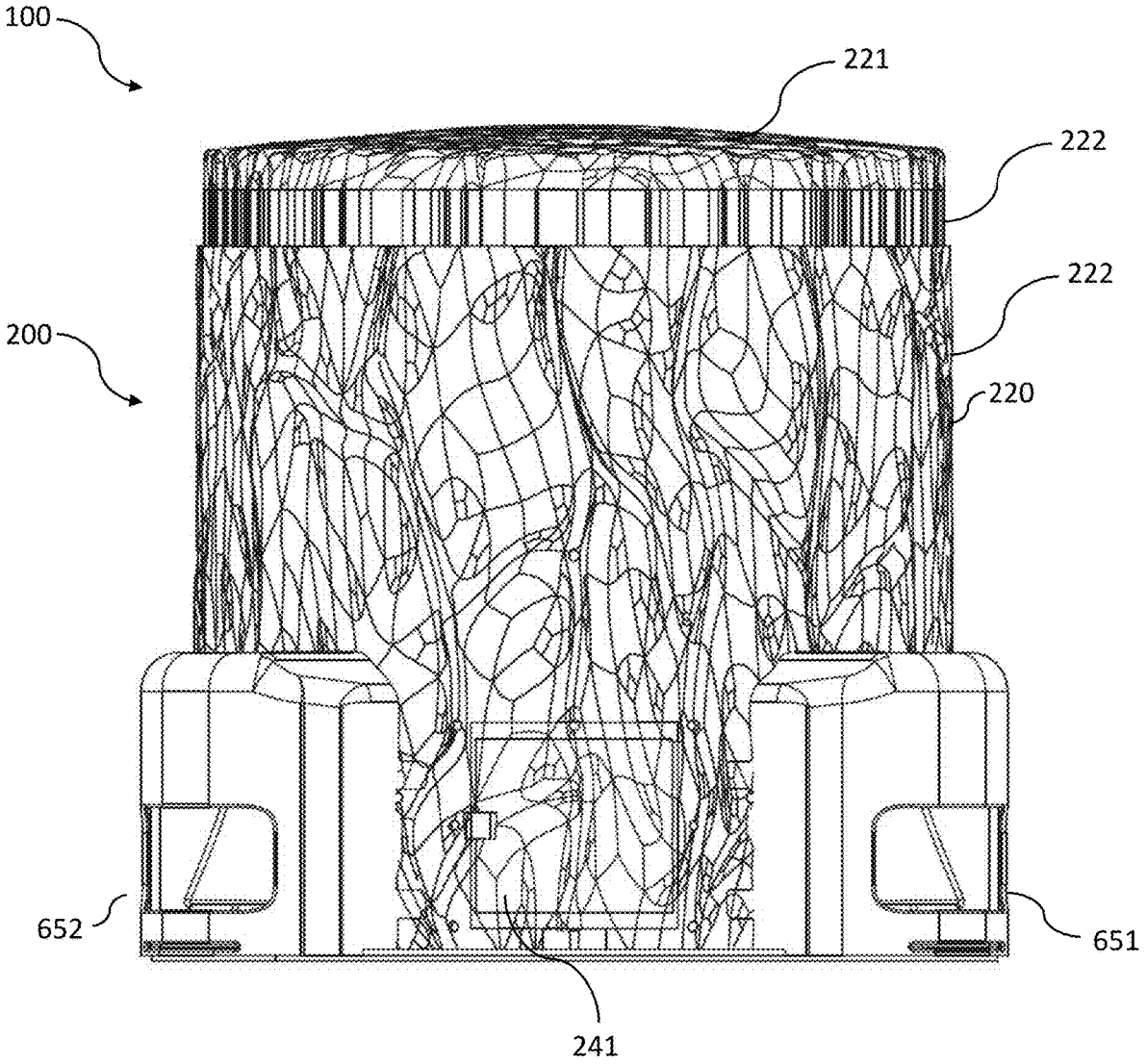
FIG. 1C is a side view of the feeder system of FIG. 1A showing an access panel that obscures an feed controller assembly.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying modes of carrying out the disclosure as presently perceived.

SUMMARY OF INVENTION

The present disclosure is directed to a feeding system for dispensing animal feed. According to at least some embodiments, this animal feeder includes a housing, where that housing has at least one sidewall. A plurality of feed outlets are in communication with the housing, and in several embodiments are built into the housing itself as apertures. The housing further includes a feed reservoir, acting as a chamber for storing feed in the housing, wherein a lower bound of the feed reservoir is defined by a directing plate. The directing plate is in communication with at least a first feed outlet of the plurality of feed outlets.

The animal feeder system further includes an actuator assembly which also resides within the housing. According to at least some embodiments, the actuator assembly includes a linear actuator, a plurality of gates, and a plurality of connecting arms affixing the linear actuator to the plurality of gates. In several embodiments, the first gate is positioned parallel to the axis of the linear actuator, and normal to the first feed outlet. The first gate can be actuated between an open position and a closed position by the linear actuator, and the first gate prevents feed in the feed reservoir from moving from the reservoir to the first feed outlet in the closed position.

The present disclosure is further directed to a method for dispensing animal feed, whereby animal feed is inserted into a feed reservoir above an actuator assembly, such that the feed has a first potential energy within the reservoir. A linear actuator of the actuator assembly is then activated, such that the linear actuator moves from a collapsed state to an extended state. In the collapsed state, a distal end of an actuating piston of the linear actuator is at a first, upper position along a movement axis parallel to the axis of the feed reservoir. In the extended state, the distal end of the actuating piston of the linear actuator is at second, lower position along the movement axis parallel to the axis of the feed reservoir.

When the linear actuator is in the extended state, feed is dispensed from the feed reservoir through at least one feed outlet, wherein the feed has a second potential energy after traveling through the at least one feed outlet. The second potential energy is less than the first potential energy. The linear actuator of the actuator assembly is then returned to the collapsed state.

In addition to feeder systems such as the above, the present disclosure is also directed to a universal feeder system in the form of a kit for attachment to an existing feed reservoir. This kit includes a mounting system at a first distal end of the axis of the kit, and a dispersion system at a second distal end of the axis of the kit. This dispersion system has an actuator system, which includes at least one feed gate. The actuator system further includes a linear actuator to articulate the at least one feed gate from a closed position to an open position. In some embodiments, this system moves the at least one feed gate from the closed position to the open position along a feed gate axis. In some embodiments, that feed gate axis intersects an axis parallel to the direction of change of a gravitational potential field at an angle of less than 45 degrees. In other embodiments, the feed gate axis is parallel to the direction of change of the potential field.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

DETAILED DESCRIPTION

While this disclosure includes a number of details and embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated.

A. Introduction

This disclosure relates to a plurality of systems and methods for feeding animals using a remote, and in some cases time-delayed, animal feeder system 100. The animal feeder system 100 includes a reservoir that is defined by a lid, directing plate, and a sidewall of a housing. The reservoir holds feed, which is to be dispersed according to a desirable, preferred, animal ("DPA"), namely, a livestock animal (e.g., horse, cow, cattle, sheep, goats) and/or game animal (e.g., deer, elk, turkey). The feed contained in the reservoir is dispensed to at least one feed outlet chamber through a corresponding feed outlet in the housing. These feed outlets are opened and closed by an actuator assembly, which includes at least one gate. In the open position, the gate allows feed to flow from the reservoir, down the directing plate, and out the feed outlet into the feed outlet chamber. In the closed position, the gate prevents feed from flowing into the outlet chamber, and thus the feed remains in the reservoir. Unlike conventional animal feeders, the animal feeder system 100 includes a number of components and features that are purposely designed to interact and provide improved feeder performance including, but not limited to, preventing (i) unscheduled, uncontrolled feeding, (ii) water and/or moisture from penetrating or migrating into the housing and damaging the animal feed therein, (iii) preventing an undesirable, un-preferred animal ("UUA") such as hogs, boars, raccoons, squirrels, birds, etc. from entering the housing to gain access to the feed, (iv) utilizing a limited power draw, and thus increasing the deployment longevity of a feeder system, by efficiently closing doors along the axis of a change in a gravitational potential field, and (v) containing a complete feeder system within a space defied by the housing, the lid, and a floor plate, preventing corrosion and unwanted disruption of electrical elements by UUA, and allowing a feeder system to operate at ground-level. In other embodiments, a universal feeder system is designed to be affixed to an existing reservoir for feed, such as a barrel, feed box, feed bag, existing hanging feed storage, other suspended feeding systems. In addition to the advantages of other inventive feeder systems here, a universal feeder system can be adapted to dispense feed into existing feeding infrastructures.

Unlike conventional gravity driven feeders, the disclosed feeder has an actuator assembly housed underneath a plate or protecting member. Said plate or member provides the disclosed feeder with a substantial advantage over conventional feeders that lack this structure because the plate or member protects moving parts of the actuator assembly from the feed that is contained in the reservoir; thus, prolonging the usable life of the system and enabling said system to use a less expensive actuator assembly. Additionally, the plate or protecting member includes at least one, and preferably a plurality, of feed channels that help direct the feed to the feed outlets formed in the housing. This helps force the feed through the outlets to prevent consolidation of said feed within the reservoir.

The disclosed feeder also provides substantial benefits over conventional gravity driven feeders because it utilizes controllable feed gates that move in a vertical direction instead of a horizontal direction relative to a floor or bottom of the system. This configuration reduces the force applied on the feed gate via the feed, which reduces the force required to open and close the controllable feed gates. By reducing this force, a lower power actuator can be used in the system, thereby reducing the overall system's cost and extending the system's runtime per battery charge.

Further, to protect dispersed feed from the elements and unwanted animal contacts, external feed chambers are attached to the housing of the disclosed feeder. These feed chambers feature an upper feed guiding surface that extends downward from the external chamber to meet the housing until it is level with the lower edge of an exterior opening. This allows feed to disperse from the reservoir into the exterior feed chamber up to the lower edge of the exterior opening without overflowing. This provides a substantial benefit over systems that lack this feature because feed that overflows the chamber will fall onto the ground, which not only waists feed but can also attract undesirable, un-preferred animal ("UUA").

B. Feeder System

As shown in FIGS. 1A-D, the feeder system 100 includes a reservoir assembly 200 that is configured to hold feed. The reservoir assembly 200 includes: (i) a housing 220, (ii) a feed lid or lid 221, and (iii) an access panel 241. The reservoir assembly 200 may include an external texture 222. Said texture 222 may be any known texture including bark or other textures that are designed to allow said feeder system to blend into its environment. As such, said texture 222 may include solid colors, snow patterns, jungle or forest camouflage patterns, earthen texture, or other texturing as needed to facilitate the blending of a feeder system 100 with its surrounding environment. In other embodiments, the external texture 222 may be omitted (e.g., FIG. 3A-3C) or a portion of the reservoir assembly 200 may an external texture 222. Similarly, as required by local regulations or as desired by an operator, feeder system 100 may be adorned with textures such as blaze orange to stand out from a given environment without departing from the scope of this disclosure.

As shown in the Figures, the housing 220 includes: (i) an access opening 240 that is designed to receive or be positioned adjacent to the access panel 241, (ii) electronic controller housing that extends inward from the access opening 240, (iii) at least one, and preferably a plurality of, feed outlets 242-245, and (iv) attachment mechanism 281. The electronic controller housing is designed to receive and protect the feed controller, while the access opening 240 is an opening formed in a side wall of the housing 220 and is designed to allow a user to access said feed controller. In other embodiments, the electronic controller housing and the access opening 240 may be omitted and access to the feed controller can be provided by removing the floor.

Figure 8A:
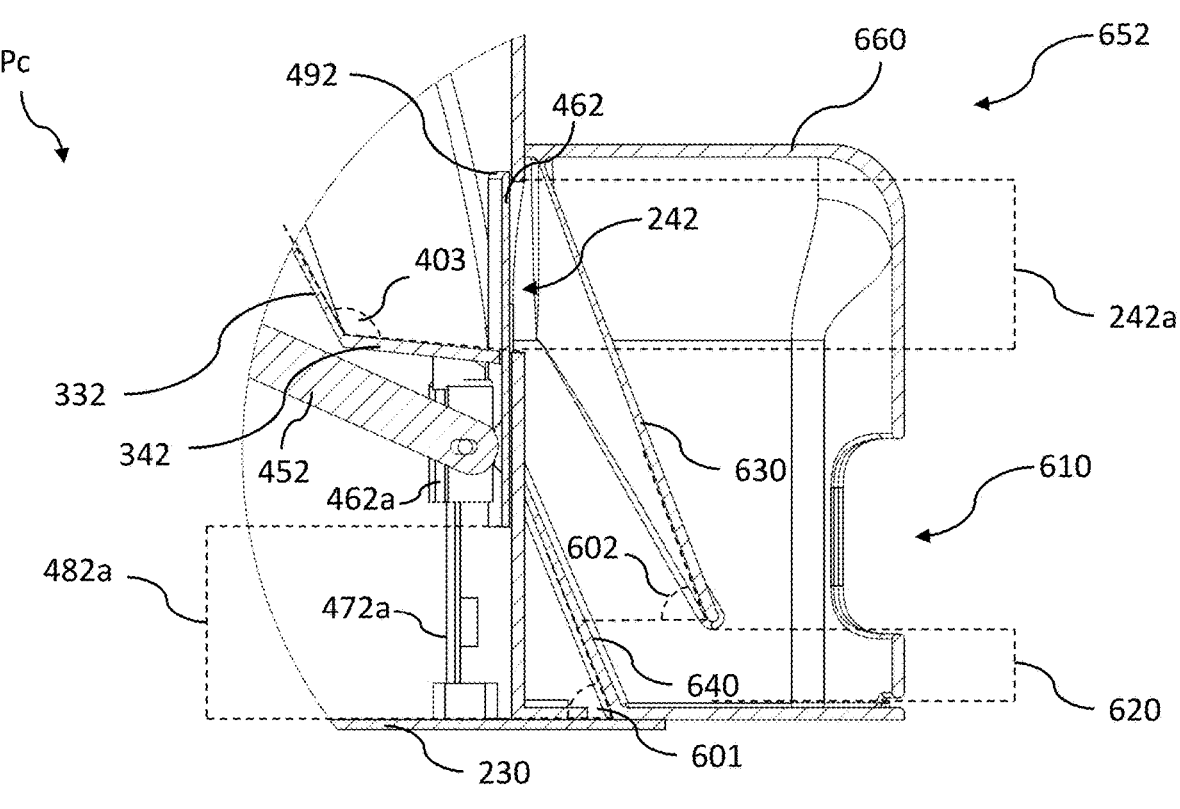
FIG. 8A is a zoomed-in view of an extent of FIG. 5B.

As best shown in FIGS. 8A, the feed outlets 242-245 are openings formed in the side wall of the housing 220, are positioned a distance 482a above the floor 230, and are designed to allow the feed that is contained in the housing 220 to flow out of said housing 220 and into the feed outlet chambers 651, 652, 653, and 654 when the actuator assembly is in the open position. Said feed outlets 242-245 have a rectangular shape with a height that is approximately equal to 242a and a width that is greater than their height. In other embodiments, the feed outlets 242-245 may have different configurations (e.g., circular, square, etc.) and there may be more (e.g., between 5 and 100) or less (e.g., between 1 and 3) feed outlets formed in said housing 220.

Figure 3A:
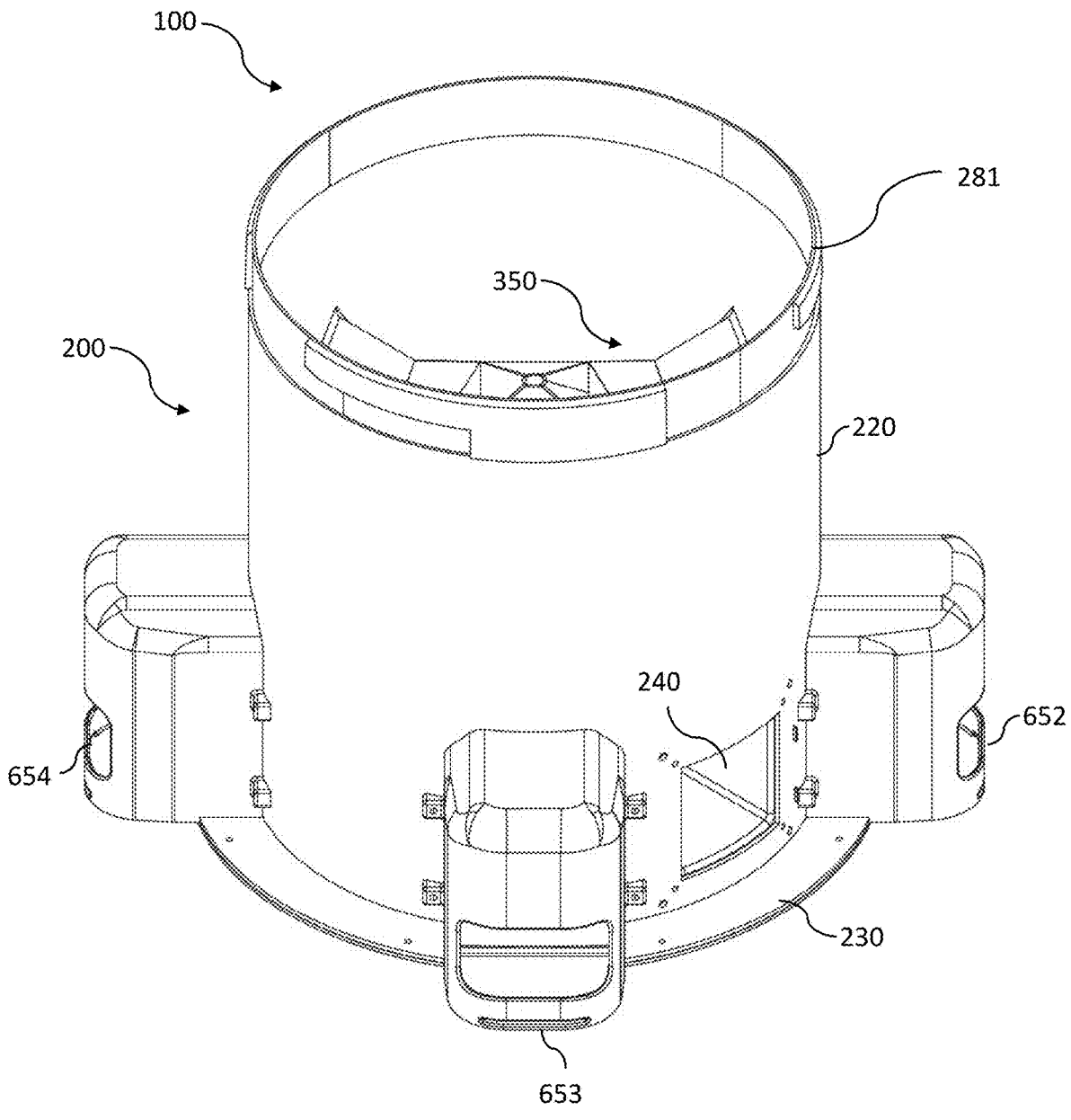
FIG. 3A is a perspective view of the feeder system of FIG. 1A, wherein the lid and exterior textures of the housing have been omitted.
Figure 3B:
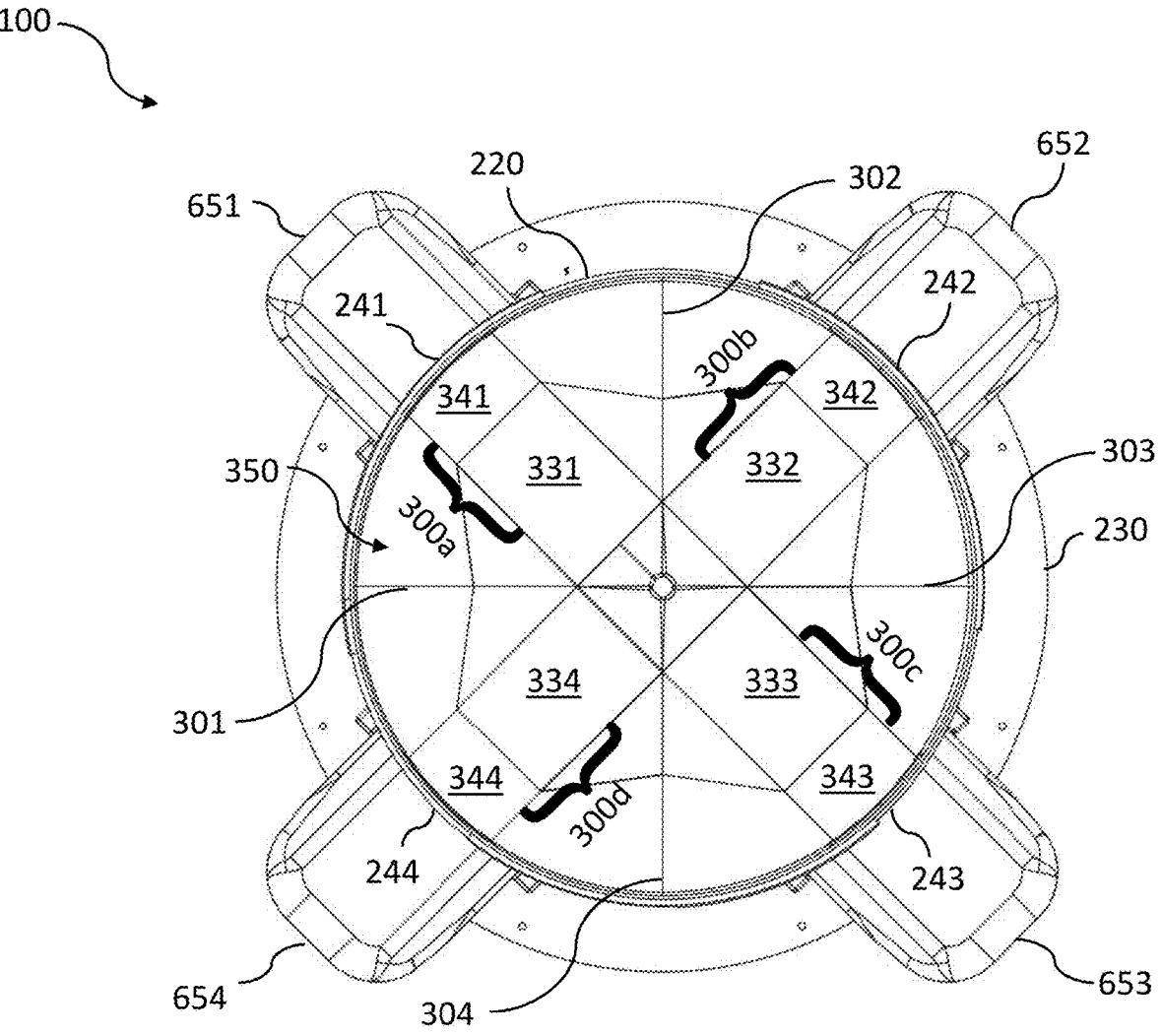
FIG. 3B is a top view of the feeder system of FIG. 3A showing a directing plate that forms a majority of the lower extent of the reservoir and protects the actuator assembly.
Figure 3C:
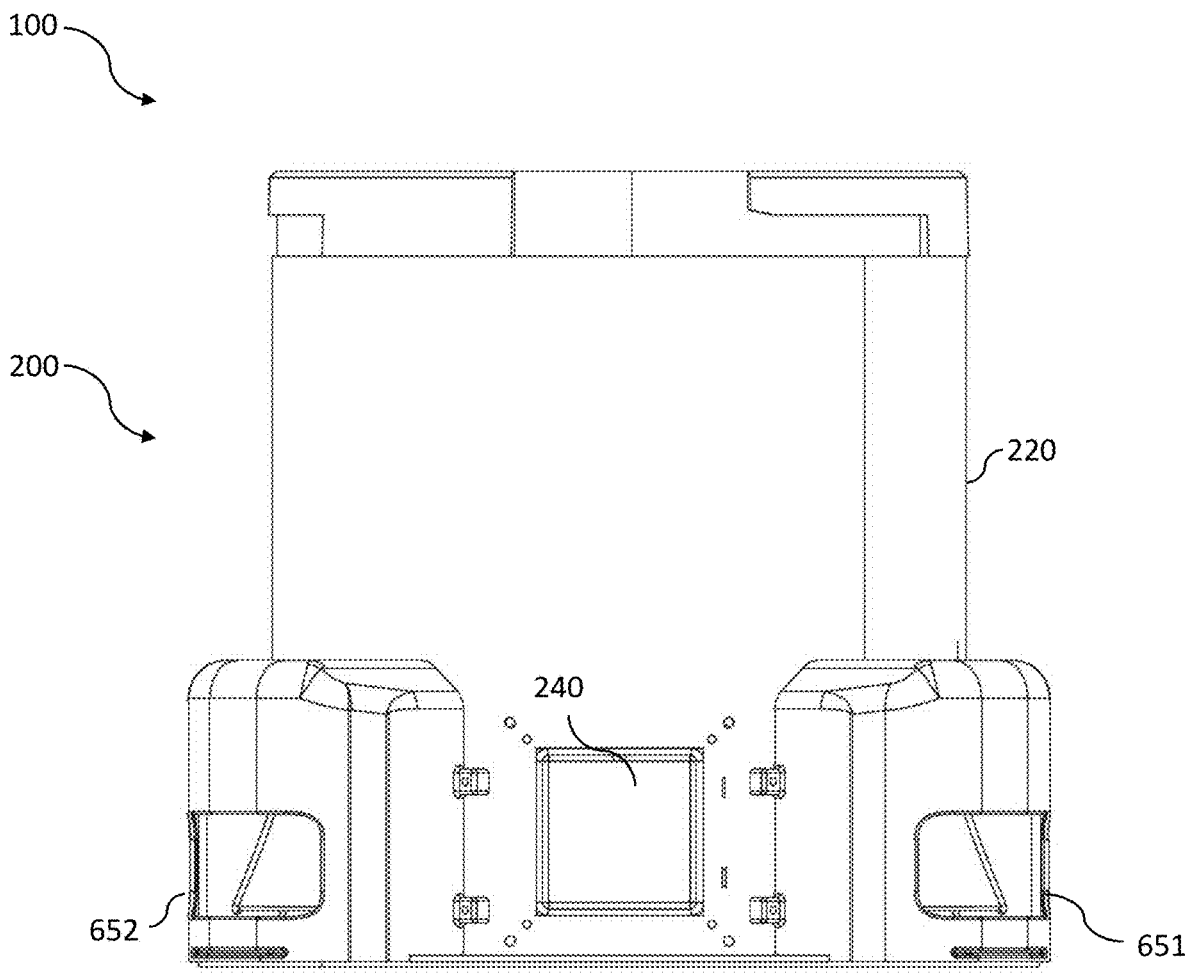
FIG. 3C is a side view of the feeder system of FIG. 3A showing the access panel that obscures the feed controller assembly.

As best shown in FIGS. 3A and 3C, the attachment mechanism 281 of the housing 220 includes a plurality of projections and recesses that are designed to interact with an extent of the feed lid 221 in order to couple said lid 221 to the housing 220. While the use of a feed lid 221 is not required to operate a feeding system depicted feeder system 100, feed lid 221 is operable to prevent, or at minimum discourage, the incursion of moisture, bacteria, fungal growth, or unwanted sunlight in the case of some feeds, which in operated are to be contained within reservoir assembly 200. Instead of coupling said lid to attachment mechanism 281, a reservoir extension 280 may be coupled thereto in order to increase the capacity of reservoir assembly 200. Based on this configuration, multiple reservoir extensions 280 may be secured to one another in order to allow the user to generate a partial-custom reservoir size. For example, each reservoir extension 280 may add an additional 5 to 20 gallons. Thus, the capacity of the reservoir may be changed from 10 gallons to 100 gallons in 5, 10, or 20 gallon increments. It should be understood, that altering the capacity of the reservoir will also vary the feed pressure, wherein the feed pressure is based on the collective gravitational potential energy of feed stored within the reservoir assembly 200.

While housing 220 is depicted as essentially cylindrical in the illustrated embodiment of FIG. 1, the disclosure herein also applies to conical, toroidal, frustoconical, and similarly symmetrical geometries as applicable to this disclosure and understood by one of skill in the art. Further, one of skill in the art would understand that the feed dispensing systems herein would be applicable to a variety of extruded polygonal geometries for housing 220, including those extruded at angles to form a frustum, and including irregular polygons as the base of such extrusions, and assemblies comprising layers of any of the above-described geometries, regardless of the axial alignment or lack thereof of such layers. According to some embodiments, and reservoir extension 600 has a low-friction interior coating designed to prevent feed particulates from coagulating on the sides of the feeder system 100.

To elevate the feeder system 100 off of the ground, the system 100 may include a mounting means 297. Elevation of the feeder system 100 may be advantageous when said feeder system 100 is designed to feed deer or other animals that are skittish with respect to ground-based feeder systems. In one embodiment, the mounting means 297 may be one or more mounting brackets 298 and 299. Said mounting brackets 298, 299 extend from the housing 220 and have multiple openings, wherein said openings are designed to receive a hook or extent of a securement mechanism (e.g., tie-down) that is surround an extent of a tree, a post, or a support in order to secure said feeder system 100 to said tree, post, or support. The type, configuration, or number of brackets 298 or 299 may be oriented as to result in a symmetrically even distribution about the axis of the housing 220 according to at least some embodiments.

Figure 1D:
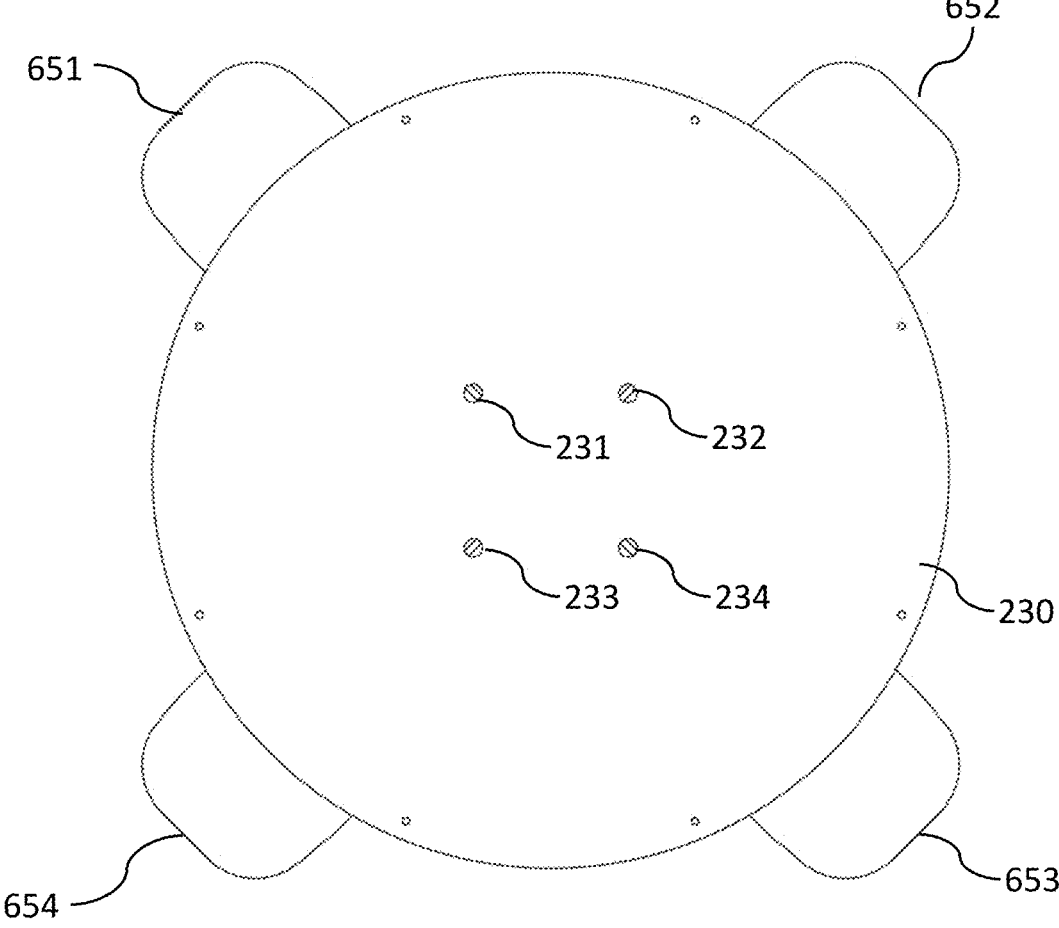
FIG. 1D is a bottom view of the feeder system of FIG. 1A showing mounting receivers that are configured to receive elongated couplers that are configured to secure at least one support structure to the bottom of said feeder system.
Figure 2:
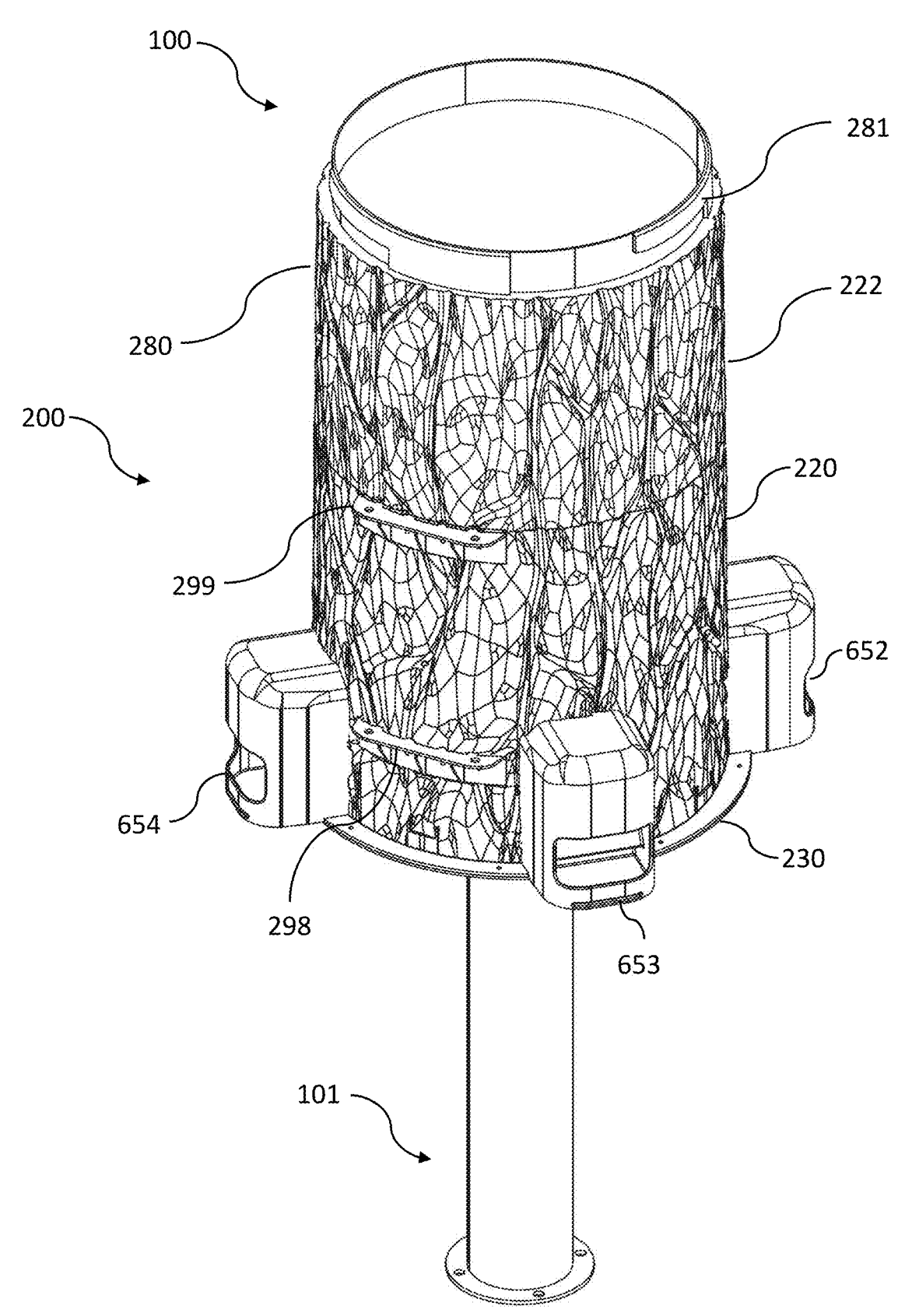
FIG. 2 is a perspective view of the feeder system of FIG. 1A, wherein: (i) the lid has been omitted, (ii) said reservoir assembly further includes a reservoir extension coupled to an upper extent of the housing, and (iii) said feeder system is affixed to a support structure.

The mounting means 297 may also or alternatively include at least one, and preferably a plurality of, mounting receivers 231, 232, 233, and 234 that are designed to secure the feeder system 100 to an external support structure 101. In particular and as shown in FIGS. 1D and 2A, said mounting receivers 231, 232, 233, and 234 are designed to receive elongated couplers that extend through a portion of a plate of the external support structure 101 in order to secure said feeder system 100 to the external support structure 101. In this embodiment, the external support structure 101 is a single vertical post secured to floor panel 230. In other embodiments, the number of mounting receivers 231, 232, 233, and 234 may be more (e.g., between 5 and 100) or less (e.g., between 0 and 3) and the external support structure 101 may have other configurations (e.g., bi-pod, tri-pod, assemblies that include four or more legs, frustoconical bases, or other known assemblies). Additionally, said mounting receivers 231, 232, 233, and 234 may be replaced with other mounting structures or features (e.g., snap fittings, magnetic fittings, attachment mechanisms such as mechanism 281 utilized to affix the feed lid 221 to housing 220 in some embodiments, locking pins, biased plates, receiver/projection, flanges, any combination of the above, or any other similar feature/structure). In other embodiments, the mounting means 297 may also or alternatively include one or more hooks, loops, projections, recesses, and other like structures that may be designed to interact with other components (e.g., tie-down) or directly interact with the support in order to secure said feeder system 100 in a manner that it is elevated above the ground. In even further embodiments, the mounting means 297 may be mounted to feed lid 221 rather than housing 220, particularly in narrow embodiments that operate by hanging from a suspension system.

The feed outlet chambers 651, 652, 653, and 654 are coupled to the housing 220 and surrounded an extent of the feed outlets 242-245. The feed outlet chambers 651-654 are designed to house said feed after it exists or is dispensed from the housing 220 via the feed outlets 242-245 in order to help ensure that said feed does not fall to the ground, to protect the feed from the weather, and to limit the amount of feed that an animal can access at a given time. The feed outlet chambers 651-654 have a rectangular prism configuration with: (i) a upper cover portion or top wall 660, (ii) two side walls, (iii) a bottom wall, and (iv) a front wall with an aperture 610 formed therein. The bottom wall of said feed outlet chambers 651-654 is not co-planer with the floor of the system 100; instead, said bottom wall is elevated relative to the floor to help protect said bottom wall from the elements and foreign objects. Said aperture 610 in the front wall is large enough to allow an animal to eat the feed that is positioned in a bottom feed resting zone 620, but is not too large to enable weather to easily enter into said chamber 651-654. As such, said aperture 610 is approximately 1.5 times larger than the associated feed outlet.

While the embodiments of multiple figures accompanying the present disclosure detail four feed outlet chambers 651-654, it should be understood that other numbers and configurations of the feed outlet chambers 651-654 are contemplated hereby. For example, said system 100 may include additional outlet chambers (e.g., five to 100) or fewer outlet chambers (e.g., one to three). In addition, other configuration of said feed outlet chambers 651-654 may include cylindrical, cuboidal, cube, may have curvilinear side walls, or any other known configuration. In said alternative embodiments, the bottom wall of the feed outlet chambers 651-654 may be lengthened to allow additional feed to be positioned in the feed resting zone 620 or it may be shortened to decrease the feed to be positioned in the feed resting zone 620. In further embodiments, the bottom wall of the feed outlet chambers 651-654 may be integrally formed with the floor of the feeder.

Removal of the feed lid 221 further facilitates exhibition of a top view of directing plate 350, which: (i) forms a majority of the lower extent of the internal feed reservoir, (ii) protects the actuator from the feed, and (iii) forms a plurality of feed channels that are designed to funnel the feed from the housing 220 and into the feed outlet chambers 651-654 via the feed outlets 242-245. Each feed channel 300a-300d of the directing plate 350 comprise two separate planar components that are joined to one another at obtuse angle 403, and are separated from their adjacent neighbor channel 300a-300d via a peak 301-304. By way of example, the feed channel 300a comprising planar surfaces 331 and 341 terminates at feed outlet 241 and is separated from channels 300b and 300d via peak 301, 304. Similarly, the feed channel 300b comprising planar surfaces 332 and 342 terminates in feed outlet 242 and is separated from channels 300a and 300c via peak 301, 302. Similarly, the feed channel 300c comprising planar surfaces 333 and 343 terminates in feed outlet 243 and is separated from channels 300b and 300d via peak 302, 303. Similarly, the feed channel 300d comprising planar surfaces 334 and 344 terminates in feed outlet 244 and is separated from channels 300a and 300c via peak 303, 304. In alternative embodiments, the feed channels 300a-300d are not limited to the bi-planar geometry, separated by corresponding peaks, and disclosed herein.

According to other or the same embodiments, feed channels 300a-300d can be oriented in opposing pairs. In other embodiments, there can be as few as one feed channel or as many as twelve feed channels, and in at least some embodiments multiple feed channels may terminate in a single feed outlet 242-245. According to some embodiments, there may be as few as two feed outlet chambers, or a greater number of feed outlet chambers. In at least some configurations of a feed system, feed channels can be separated by peaks. In some embodiments, peaks are chamfered to promote an even feed distribution through feed outlet chambers. In some embodiments, directing plate 350 can include a plurality of enclosed tunnels in place of, or in addition to, feed channels for directing feed to feed outlet chambers. In some embodiments, each feed gate can be connected to a different actuator assembly 400.

As shown in FIG. 3B, feed channels 300a-300d are separated from corresponding feed outlet chambers by feed outlets. These feed outlets 341, 342, 343, 344, are variably covered by corresponding controllable feed gates 461, 462, 463, 464, which as mentioned above are controlled by an actuator assembly 400. The actuator assembly 400 moves the feed gates 461, 462, 463, 464 between a "closed" position, where feed in reservoir assembly 200 is unable to flow through feed channels (331, 341), (332, 342), (333, 343), and (334, 344) and feed outlets 241, 242, 243, 244 because feed outlets 241, 242, 243, 244 are closed, to an "open" position, where feed outlets 241, 242, 243, and 244 are open, such that feed can flow through channels (331, 341), (332, 342), (333, 343), and (334,344) and feed outlets 241, 242, 243, 244 to feed outlet chambers 651, 652, 653, and 654.

As shown in the Figures, the feed channels (331, 341), (332, 342), (333, 343), and (334,344) are each symmetrical about a line of symmetry equidistant from their respective adjacent peaks 301, 302, 303, and 304. In other or the same embodiments, feed channels may take the form of a single uniform surface, including an extruded semicircular channel or singular planar surface. In other embodiments, feed channels need not be symmetrical, particularly embodiments wherein corresponding feed outlets or their associated feed outlet chambers are not symmetrical about such an axis.

As shown in the Figures, the system 100 includes at least one, and preferably a plurality of, controllable feed gates 461-464. Said controllable feed gates 461-464 are designed to move vertically relative to the floor of the system 100, when said actuator assembly 400 moves from an extended position to a collapsed position, whereby said feed gates 461-464 move from unblocking the feed outlets 242-245 to blocking the feed outlets 242-245. This vertical sliding configuration of the controllable feed gates 461-464 provides a substantial benefit over conventional feeders that lack this vertical sliding configuration because the gravitational force that is applied on the controllable feed gates 461-464 via the feed is less than the gravitational force that would be applied on an alternative version of the feed gates that have a non-vertical sliding configuration (e.g., horizontal). While the embodiments of multiple figures accompanying the present disclosure detail four feed gates 461-464, it should be understood that other numbers and configurations of the feed gates 461-464 are contemplated hereby. For example, said system 100 may include additional gates (e.g., five to 100) or fewer gates (e.g., one to three).

As shown in the Figures, the feed gates 461-464 are: (i) larger than the feed outlets 242-245, (ii) are positioned in an interior of the housing 220, and (iii) include an upper extent that is positioned above the directing plate 350 and an lower extent that is positioned below the directing plate 350. The upper extent that is positioned above said directing plate 350 is the only movable component of the system 100 that comes into contact or is exposed to weather or feed. This provides a substantial benefit over conventional systems that lack this feature because it limits the number of components that are exposed to said weather and/or feed. The lower extent that is positioned below said directing plate 350 includes a guides 461a, 461b, 462a, 462b, 463a, 463b, 464a, 464b and projections 450a-450d. As will be explained below, the guides 461a, 461b, 462a, 462b, 463a, 463b, 464a, 464b interact with guide posts 471a, 471b, 472a, 472b, 473a, 473b, 474a, 474b that help ensure that the controllable feed gates 461-464 move up and down when the actuator assembly moves from the collapsed to the expanded state. Additionally, the projections 450a-450d are designed to interact with the connecting arms 451, 452, 453, and 454 to form pivot mechanism 451a, 452a, 453a, 454a, which enable said actuator assembly 400 to move the controllable feed gates 461-464. It should be understood that in other embodiments, the guides 461a, 461b, 462a, 462b, 463a, 463b, 464a, 464b interact with guide posts 471a, 471b, 472a, 472b, 473a, 473b, 474a, 474b may be replaced by a recess and a projection.

As shown in the Figures, the system 100 includes an actuator assembly 400 that is configured to move the feed gates 461-464 from the closed position (FIG. 8A) to the open position (FIG. 8B) based on a control signal from the feed controller, wherein said control signal may be based on any information (e.g., time, temperature, weather, light, etc.). The actuator assembly 400 is positioned under the directing plate 350, wherein said directing plate 350 protects said actuator assembly 400 from the feed. The actuator assembly 400 includes: (i) a linear actuator 420, (ii) a plurality of connecting arms 451, 452, 453, and 454. The linear actuator 420 of the actuator assembly 400 is comprised of actuating piston 430 operated in the illustrated embodiment by solenoid 440. As shown in the Figures, the linear actuator 420 is positioned in the middle or center of the feeder and is designed to move from a collapsed state when the gates are placed in the closed position to an expanded state when the gates are placed in the open position. In other embodiments, the linear actuator may be replaced with other mechanisms that can move the feed gates 461-466 from the closed position to the open position and back to the closed position. Examples of said mechanisms may include rotational or rotary actuators that are coupled to a pulley system, worm drive actuators, or any other similar mechanism.

Figure 4A:
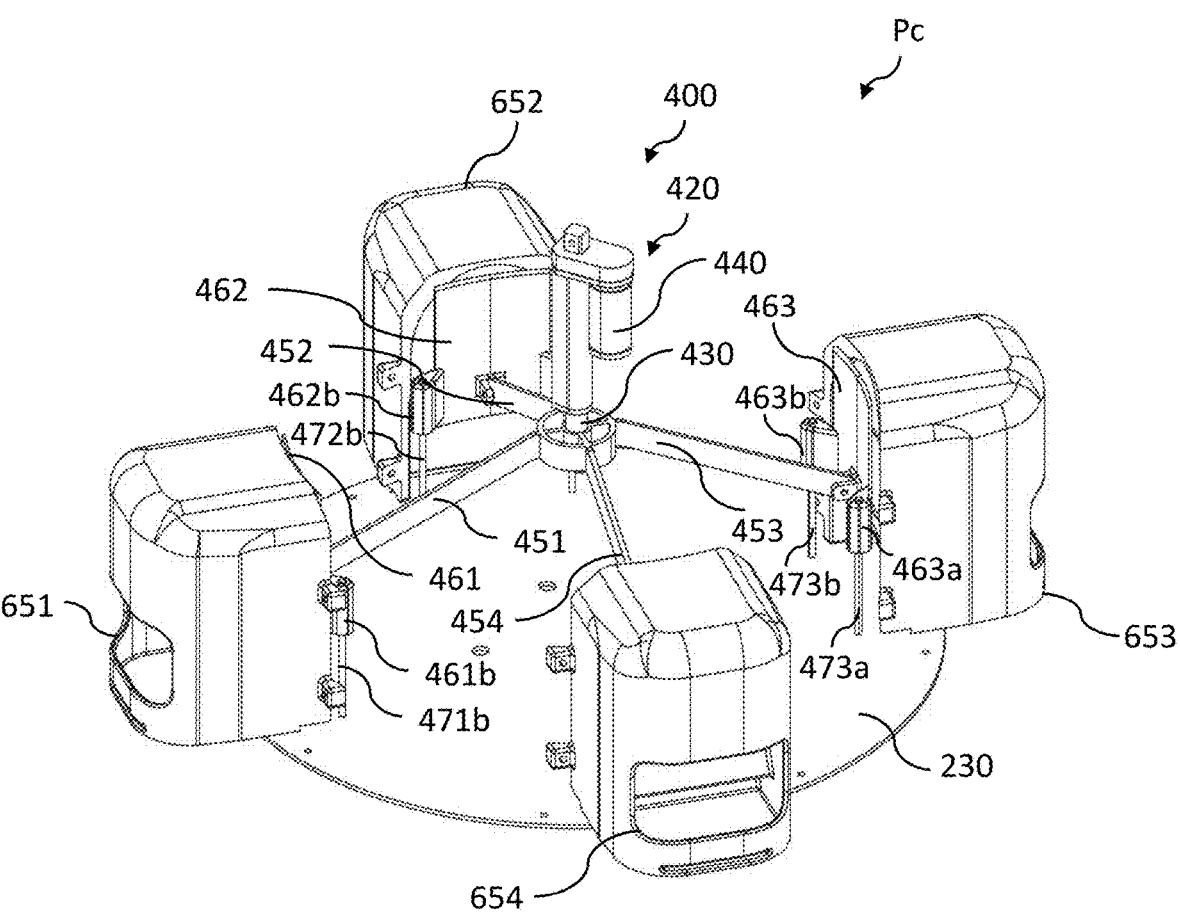
FIG. 4A is a perspective view of the feeder system of FIG. 1A, wherein the reservoir assembly has been omitted to show an actuator assembly in a closed position.
Figure 4B:
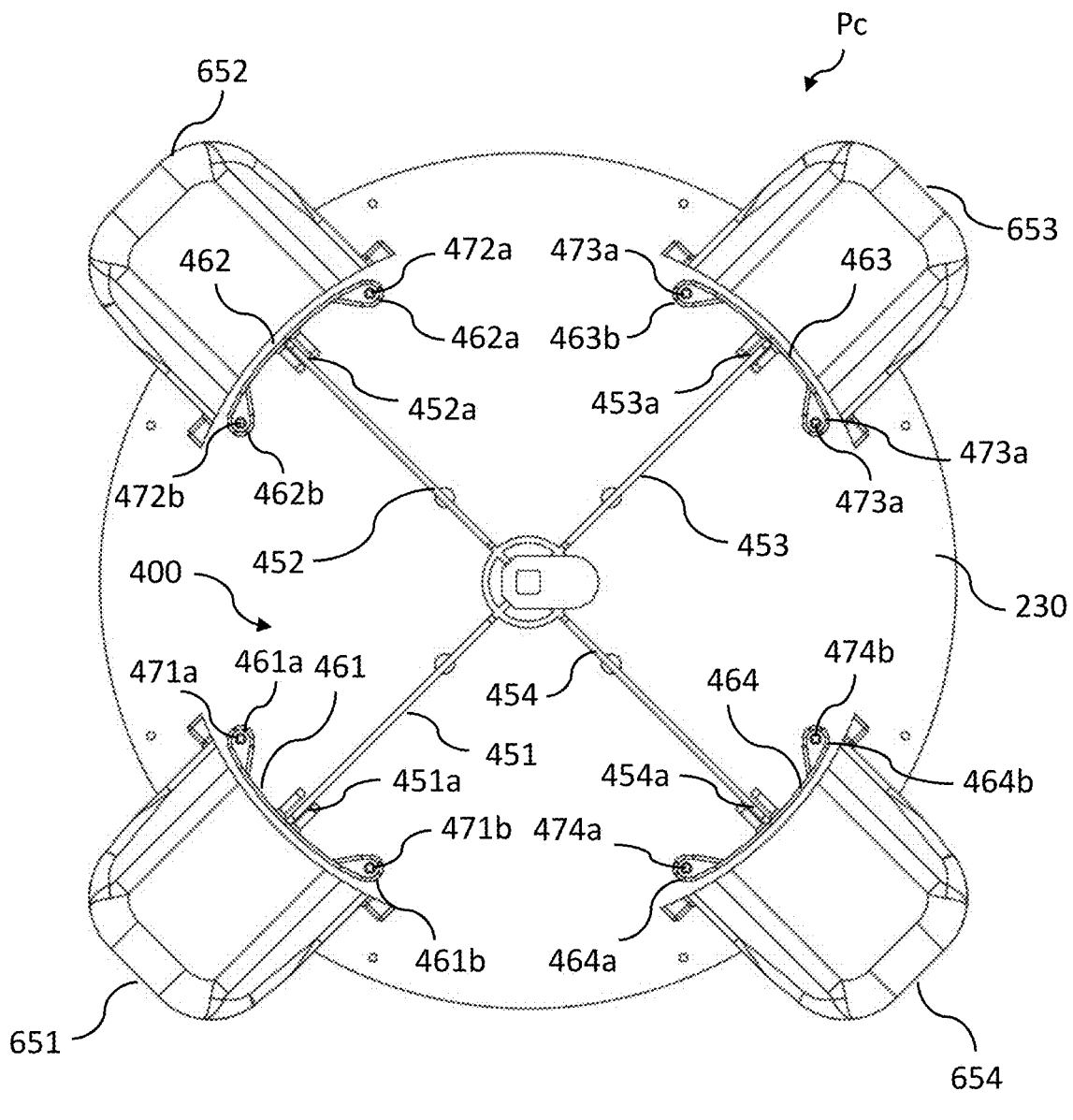
FIG. 4B is a top view of the feeder system shown of FIG. 4A.

To allow the movement of the actuator 420 to move the feed gates 461-464, said system 100 includes a plurality of connecting arms 451, 452, 453, and 454. Said connecting arms 451-454 are coupled to the actuating piston 430 of the linear actuator 420 and an extent of the feed gates 461-464. The connecting arms 451, 452, 453, and 454 engage with feed gates 461, 462, 463, and 464 through a corresponding pivot mechanism 451a, 452a, 453a, 454a. The feed gates 461-464 are further constrained at their extremities through corresponding guides, for instance guides 463a and 463b corresponding to feed gate 463 in the embodiment of FIG. 4A. These guides, correspondingly numbered 461a and 461b for feed gate 461, 462a and 462b for feed gate 462, 463a and 463b for feed gate 463, and 464a and 464b for feed gate 464, engage with guide posts. Guide posts 471a and 471b correspond to feed gate 461, guide posts 472a and 472b correspond to feed gate 472, guide posts 473a and 473b correspond to feed gate 473, and guide posts 474a, 474b correspond to feed gate 464. While the perspective view of FIG. 4A displays some of these relationships, the top view of these components displayed in FIG. 4B is illustrates these details. Pivot mechanisms 451a, 452a, 453a, 454a need not be constrained by the pin and hole mechanisms displayed in the accompanying figures. Rather, those of skill in the art will understand that ball and socket mechanisms, standard hinges, and other mechanisms known in the mechanical arts for engaging in a pivotal relationship do not depart from the scope of this disclosure.

Figure 5A:
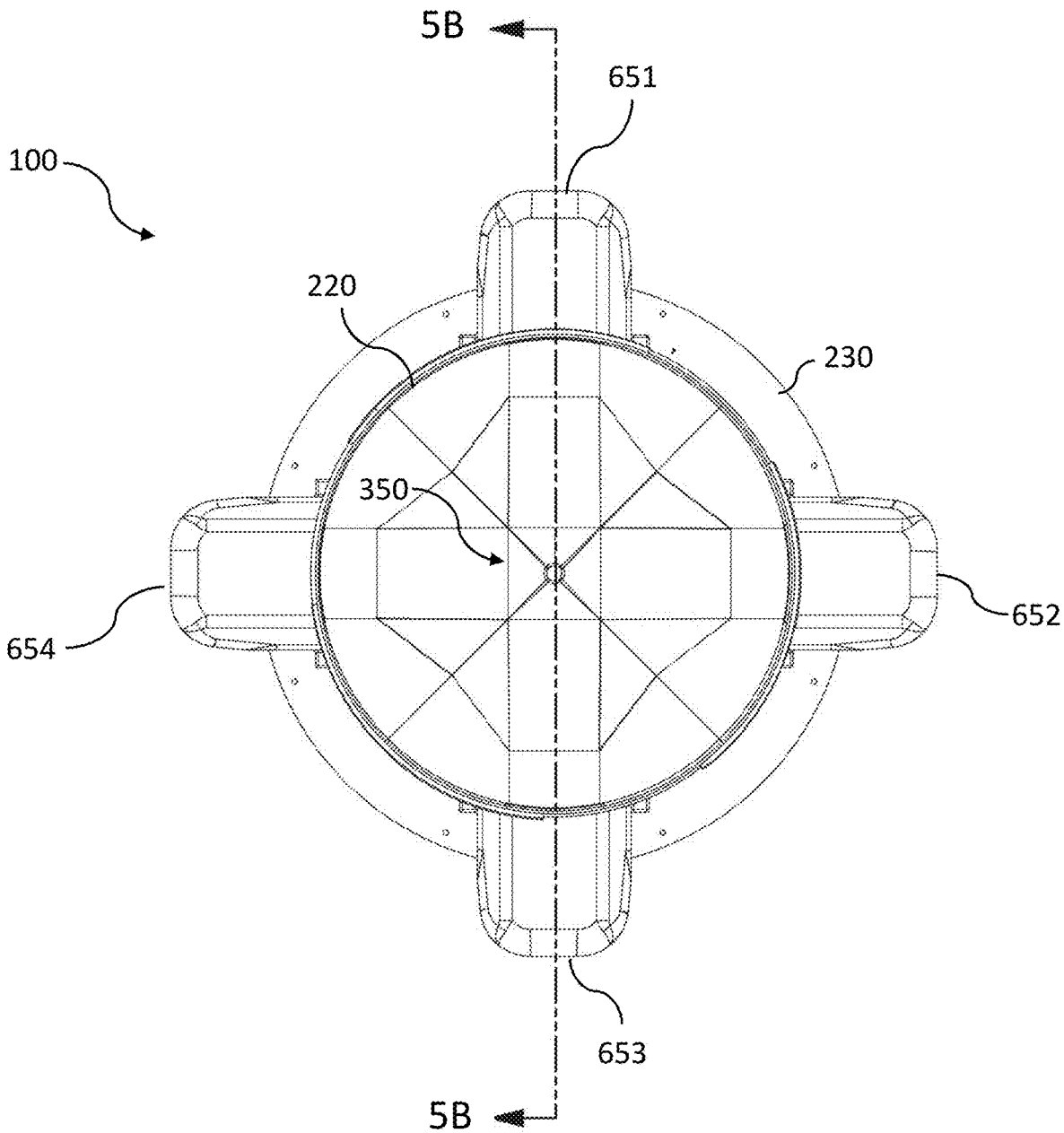
FIG. 5A is a top view of the feeder system shown in FIG. 3A, wherein the actuator assembly in the closed position.
Figure 5B:
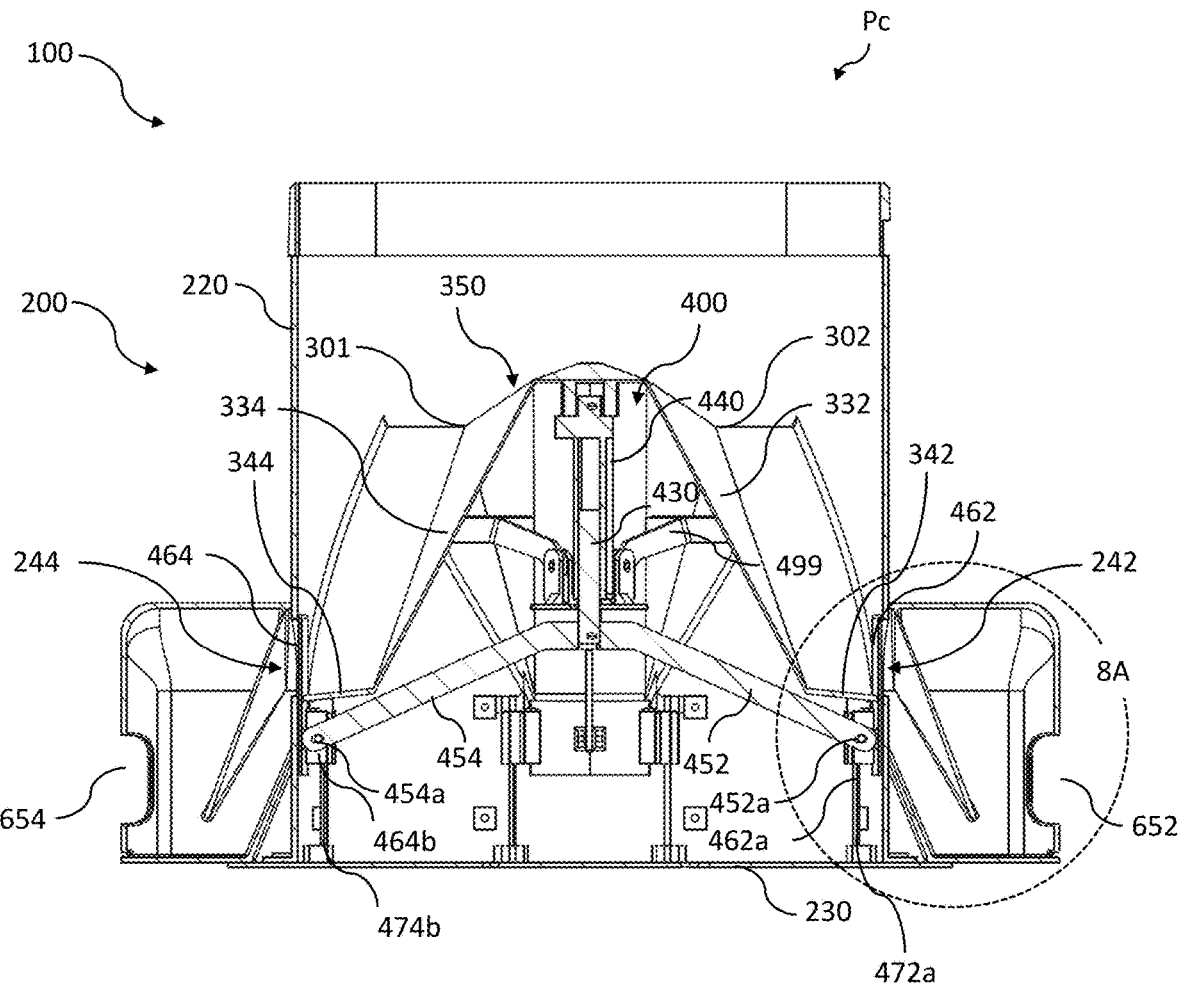
FIG. 5B is a cross-sectional view of the feeder system taken along line 5B-5B line of FIG. 5A, wherein the plurality of feed outlets are blocked by the plurality of controllable feed gates.

FIG. 5A provides a top view of the feeder system 100 shown in FIG. 3A, showing the wherein a directing plate 350, housing 220, and plurality of feed outlet chamber 651, 652, 653, and 654, while FIG. 5B, showing the exemplary feed gates 462 and 464, along with the corresponding actuator assembly 400, in the closed position. As with feed gates 462 and 464 of FIGS. 4A and 4B, feed gates 462 and 464, like actuating piston 430 and their corresponding arms 451, 452, 453, and 454 are upwardly displaced from floor 230 in the closed position of the illustrated embodiment. In this closed position, feed outlets 242 and 244 are covered by corresponding gates 462 and 464. As such, feed under the influence of gravity, building in reservoir assembly 220, which has a lower bound of directing plate 350, cannot flow through feed outlets 242 and 244 into their respective feed outlet chambers 652 and 654.

FIG. 5B further demonstrates the geometry of at least one embodiment of directing plate 350, wherein feed channels are comprised of surfaces 334 and 344, and surfaces 332 and 342, so as to direct feed within reservoir assembly 220 toward and ultimately through feed outlets 242 and 244 unless obstructed by their respective gates 462 and 464. In the illustrated embodiment, feed flows courtesy of a gravitational field, wherein feed located in the reservoir assembly 220, having a lower bound at directing plate 350, has a higher average gravitational potential energy than feed which has flowed into feed outlet chambers 652 and 654, as gravitational potential energy of the feed decreases along the axis of the reservoir assembly 220, actuator assembly 400, and path of travel of feed gates 462 and 464. According to at least some embodiments, the linear actuator 440 need not displace along the same axis as the axis of the reservoir assembly 200, and the feed gates 462 and 464 need not displace along the same axis as the displacement of the linear actuator 440.

Figure 6A:
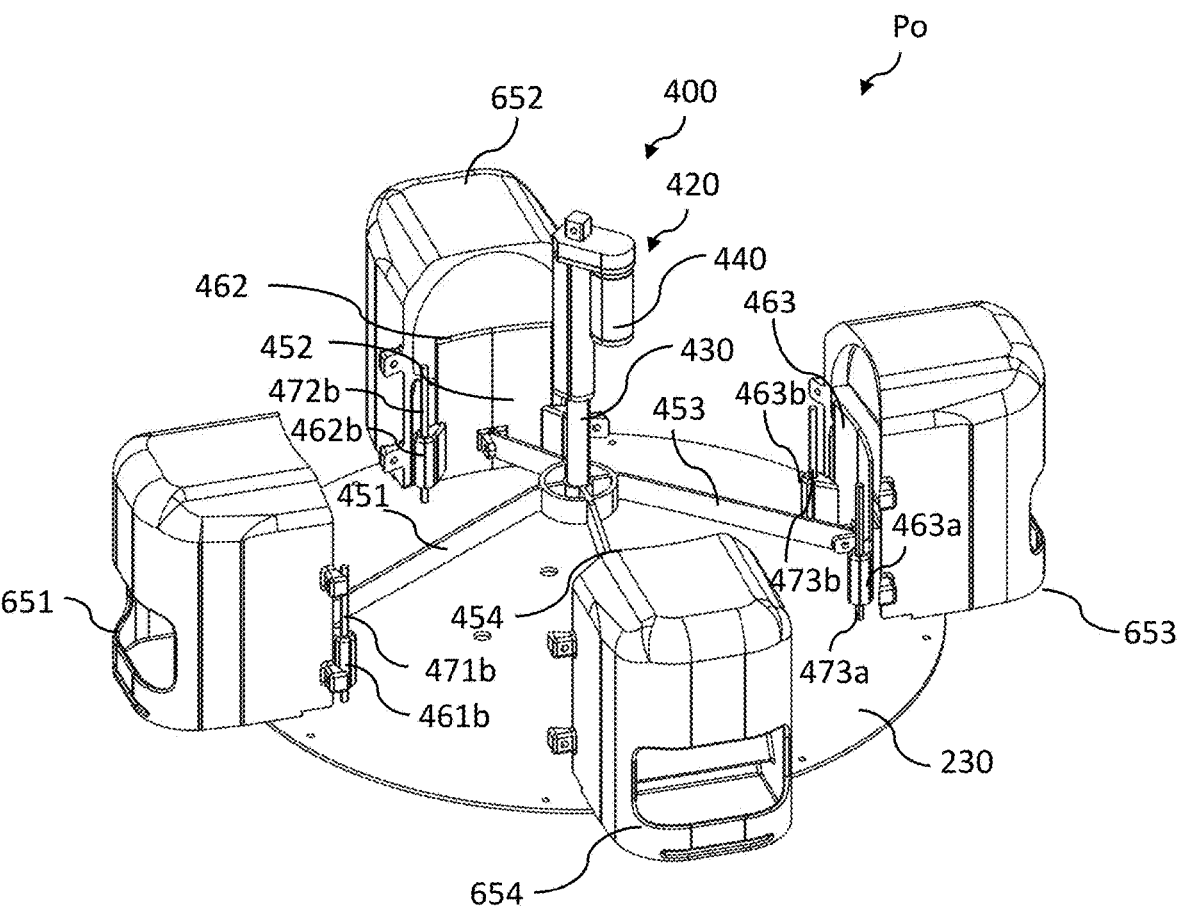
FIG. 6A is a perspective view of the feeder system shown of FIG. 1A, wherein the reservoir assembly has been omitted to show an actuator assembly in an open position.
Figure 6B:
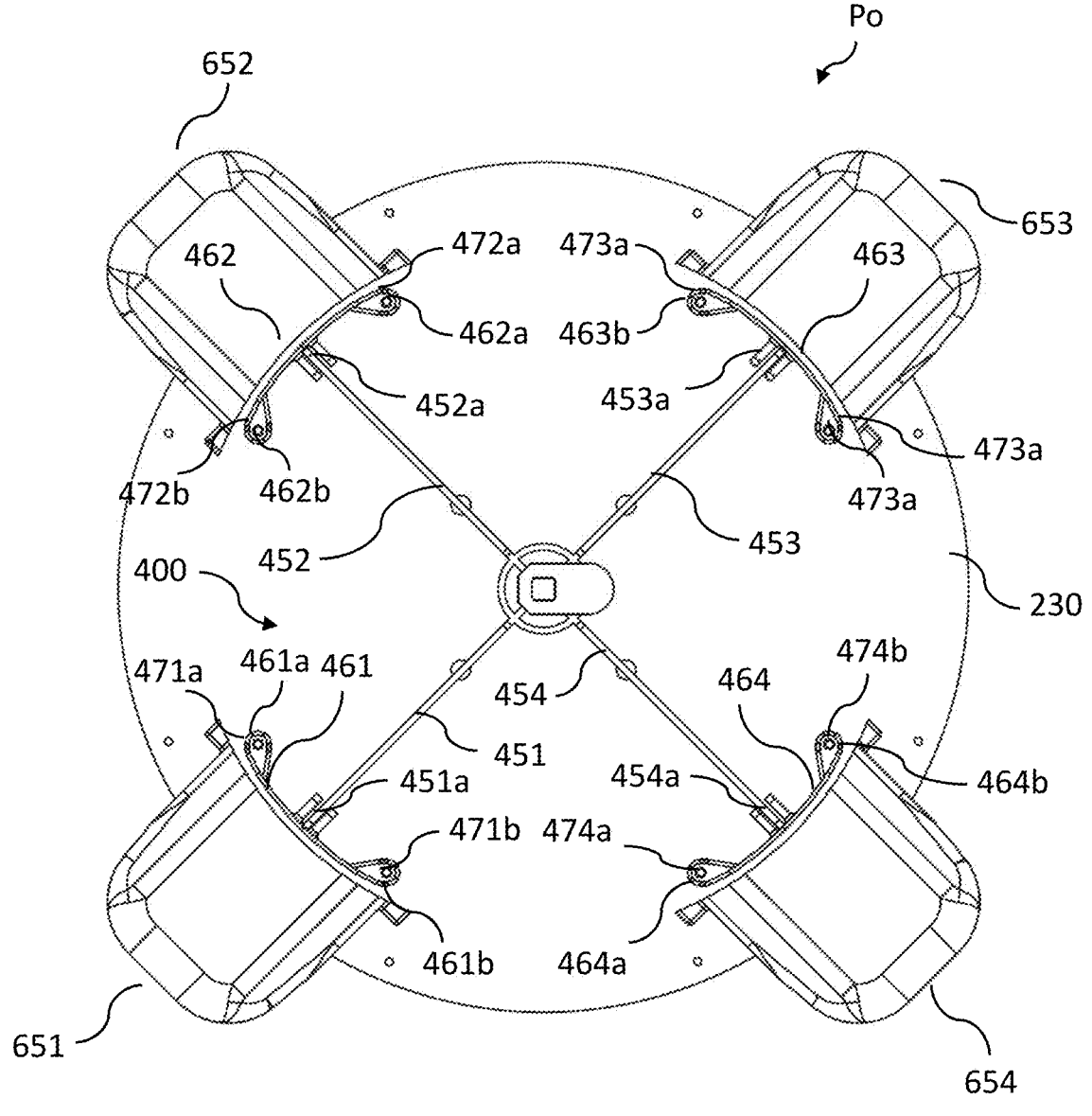
FIG. 6B is a top view of the feeder system shown of FIG. 6A.

Turning to FIG. 6A, the housing 220 is removed to depict a perspective view of an actuator assembly 400, feed gates 461, 462, 463, 464, feed outlet chambers 651, 652, 653, and 654, and floor panel 230 of a feeder system 100. In this Figure, the actuator assembly 400 operates gates 461, 462, 463, 464 that are cooperatively arranged with respect to corresponding feed outlet chambers 651, 652, 653, and 654, and wherein the actuator assembly 400 and feed gates 461, 462, 463, 464 are in the open position. In the illustrated embodiment, actuator assembly 400 includes a plurality of connecting arms 451, 452, 453, and 454 connected to actuating piston 430, terminating with feed gates 461, 462, 463, and 464. Feed gates 461, 462, 463 and 464 operate in an open position to allow communication between feed channels (331, 341), (332, 342), (333, 343), and (334,344) and feed outlet chambers 651, 652, 653, and 654 respectively, as depicted in later figures. FIG. 6B depicts a top view of the housing-absent view of FIG. 4B; however, as with corresponding FIG. 6A, this figure depicts this top view while the actuator assembly 400 and feed gates 461, 462, 463, 464 are in the open position.

Figure 7A:
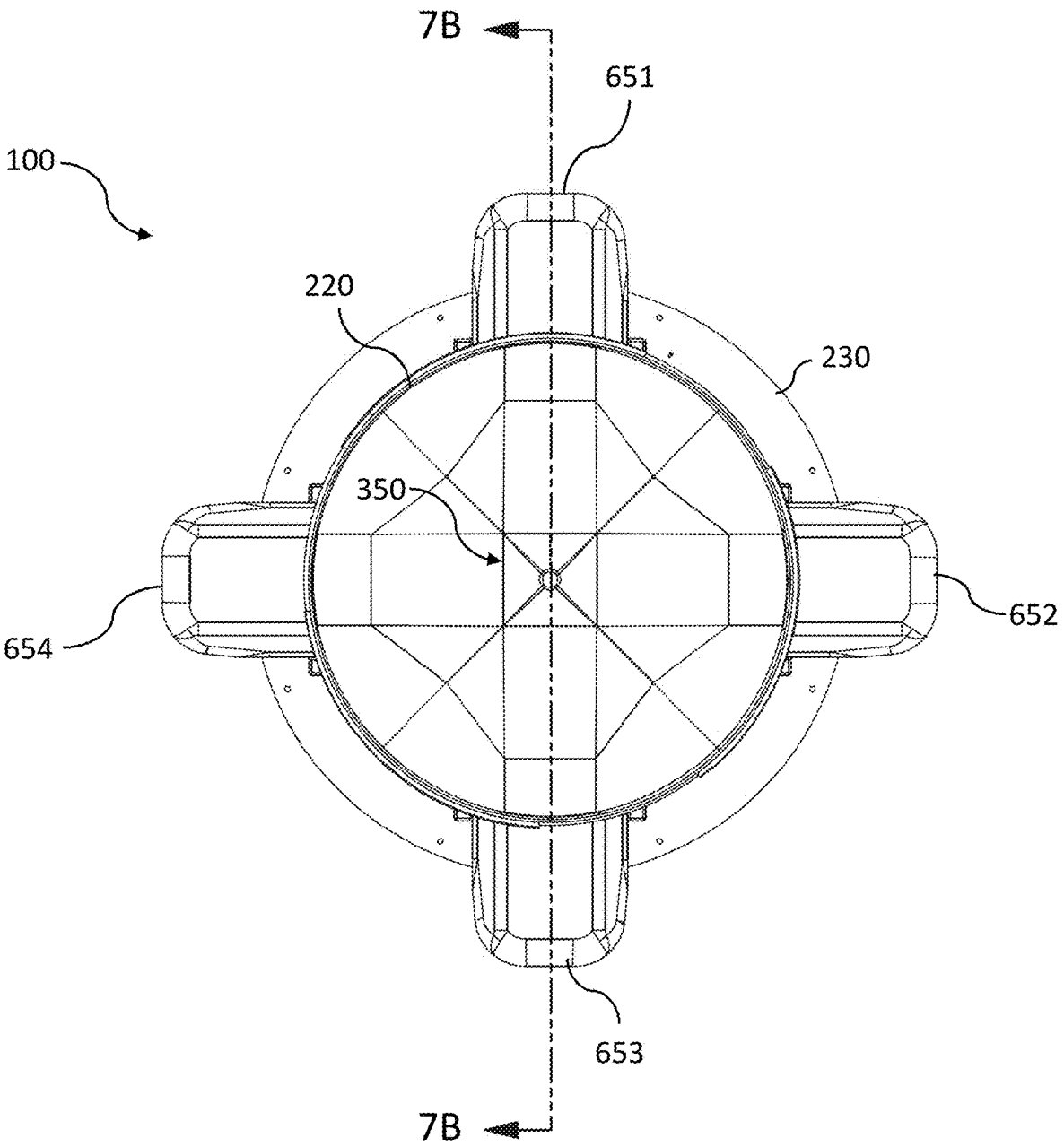
FIG. 7A is a top view of the feeder system shown in FIG. 3A, wherein the actuator assembly in the open position.

Like FIG. 5A, FIG. 7A provides a reference top view of the feeder system 100 shown in FIG. 3A, showing the wherein a directing plate 350, housing 220, and plurality of feed outlet chambers 651, 652, 653, and 654. As with the corresponding closed position view FIG. 5B, section view 7B, showing the exemplary feed gates 462 and 464, along with the corresponding actuator assembly 400, in the open position. As with feed gates 462 and 464 of FIGS. 6A and 6B, feed gates 462 and 464, like actuating piston 430 and their corresponding arms 451, 452, 453, and 454 are closer to floor 230 than in the closed position of the illustrated embodiment shown in FIG. 5B. In this open position, feed outlets 242 and 244 are unobstructed corresponding gates 462 and 464. As such, feed under the influence of gravity, building in reservoir assembly 220, which has a lower bound of directing plate 350, is able flow through feed outlets 242 and 244 into their respective feed outlet chambers 652 and 654.

Figure 8B:
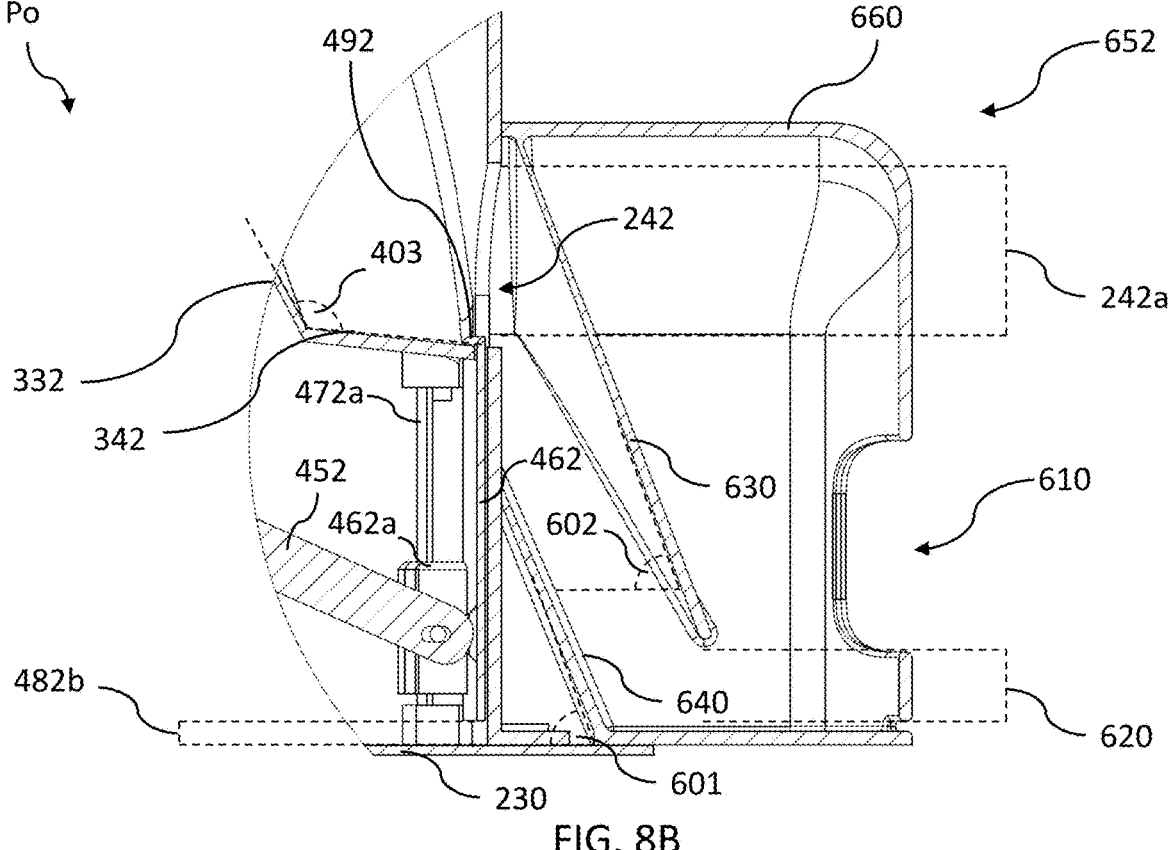
FIG. 8B is a zoomed-in view of an extent of FIG. 7B.
Figure 10A:
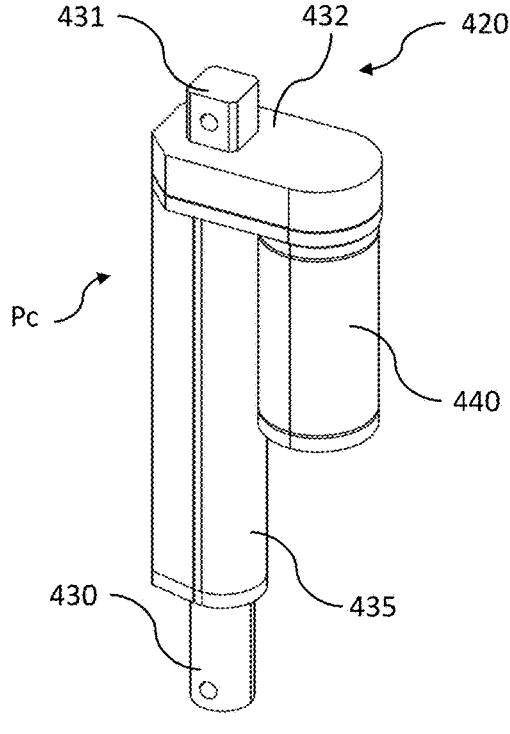
FIG. 10A is a perspective view of the linear actuator of the actuator assembly in the closed position.
Figure 10B:
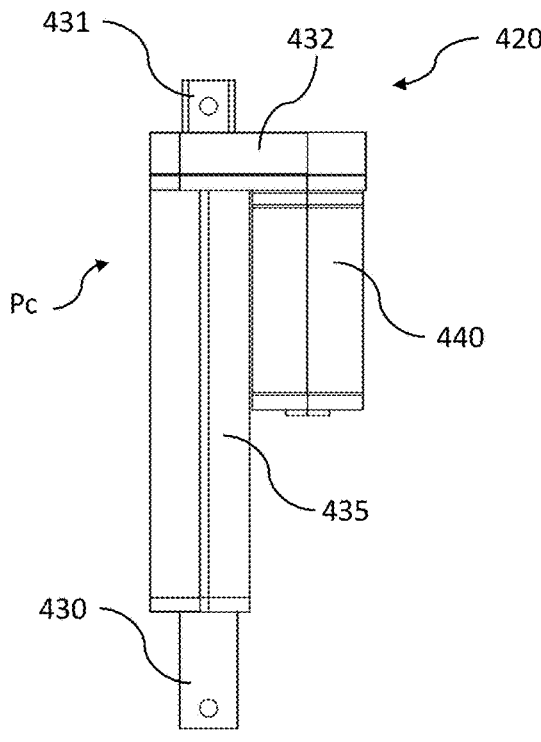
FIG. 10B is a side view of view of the linear actuator of FIG. 10A.
Figure 10C:
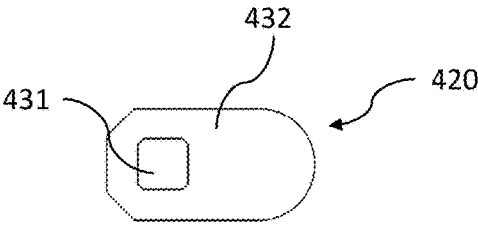
FIG. 10C is a top view of the linear actuator of FIG. 10A.
Figure 10D:
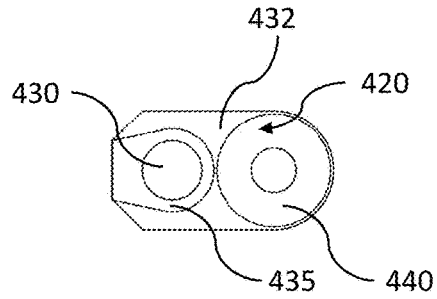
FIG. 10D is a bottom view of the linear actuator of FIG. 10A.

Turning to the detail views of FIGS. 8A and 8B, a detail view of feed outlet chamber 652 and surrounding assemblies is shown. FIG. 8A shows gate 462 in a closed position, covering feed outlet 242. By contrast, FIG. 8B shows gate 462 in an open position, such that feed outlet 242 is unobstructed. In the unobstructed open position shown in FIG. 8B, feed is able to travel down the channel 300a-300d, over a chamfered edge 492 of feed gate 462, through the feed outlet 242 having area 242a, and into feed outlet chamber 652. This area 242a is open due to the shifted position of gate 462 between the open and closed positions, such that distance 482a, between the bottom of gate 462 and floor 230 in the closed position, is greater than distance 482b, between the bottom of gate 462 and floor 230 in the open position. In other words, when the actuator assembly

400 is in the closed position and the actuator is in the collapsed state, there is a distance 482a extends from the floor 230 to the bottom of gate 462 that is greater than the height 242a of the feed outlet 241-244. This can be seen in FIG. 8B, because when the actuator assembly 400 is in the open position and the actuator is in the expanded state, there is a distance 482b that extends from the floor 230 to the bottom of gate 462 is no zero or a negative number. Stated another way, the directing plate 350, feed gates 461-464, actuator assembly 400 are positioned a sufficient distance above the floor 230 of said system 100 to enable the movement of the actuator assembly 400 and feed gates 461-464 to be fully contained within the housing 220. As such, neither the feed gates 461-464 nor the actuator assembly 400 extend past or below a lower edge of the housing 220 no matter their position or state.

Here, feed within outlet chamber 652 is guided by an upper feed guide surface 630 and a lower feed guide surface 640 into a feed resting zone 620. Feed resting zone 620 falls underneath aperture 610, where an animal is able to access feed in the feed resting zone 602. Feed in this position is protected from the elements by an upper cover portion 660 of the outlet chamber 652. While this upper cover portion 660 is depicted in the present figures as parallel to floor 230, other geometries are contemplated by the scope of this disclosure, including the geometries of comparable outlet chambers 1651, 1652, and 1654 of FIG. 2B.

In the illustrated embodiment, lower feed guide surface is angled at an acute angle 601 with respect to floor 230. Further, upper feed guide surface 630 is angled at an acute angle 602 with respect to an imaginary surface parallel to floor 230. In the illustrated embodiment, angles 601 and 602 are within approximate 15 degrees of one another, and in some embodiments angles 601 and 602 are equal, to facilitate even flow of feed into feed resting zone 620.

As shown in FIGS. 8A and 8B, the upper feed guide plate 630 allows feed to come to rest in the feed resting zone 620 despite pressure applied to feed in resting zone 620 by the greater gravitational potential of feed in a reservoir such as reservoir 220. In the illustrated embodiment, upper feed guide plate 630 terminates at approximately the same vertical height above floor 230 as the lower bound of aperture 610. In this way, feed resting in resting zone 620 does not overflow through aperture 610, helping to keep feed for dispersion contained within feed outlet chamber 652. In other words, the lowest point of the upper feed guide plate 630 is approximately equal to the highest point of the bottom wall of the aperture 610. Containing feed within an outlet chamber 652 offers several advantages, including preventing incursion of moisture and sunlight, preserving the appeal of dispensed feed.

Figure 7B:
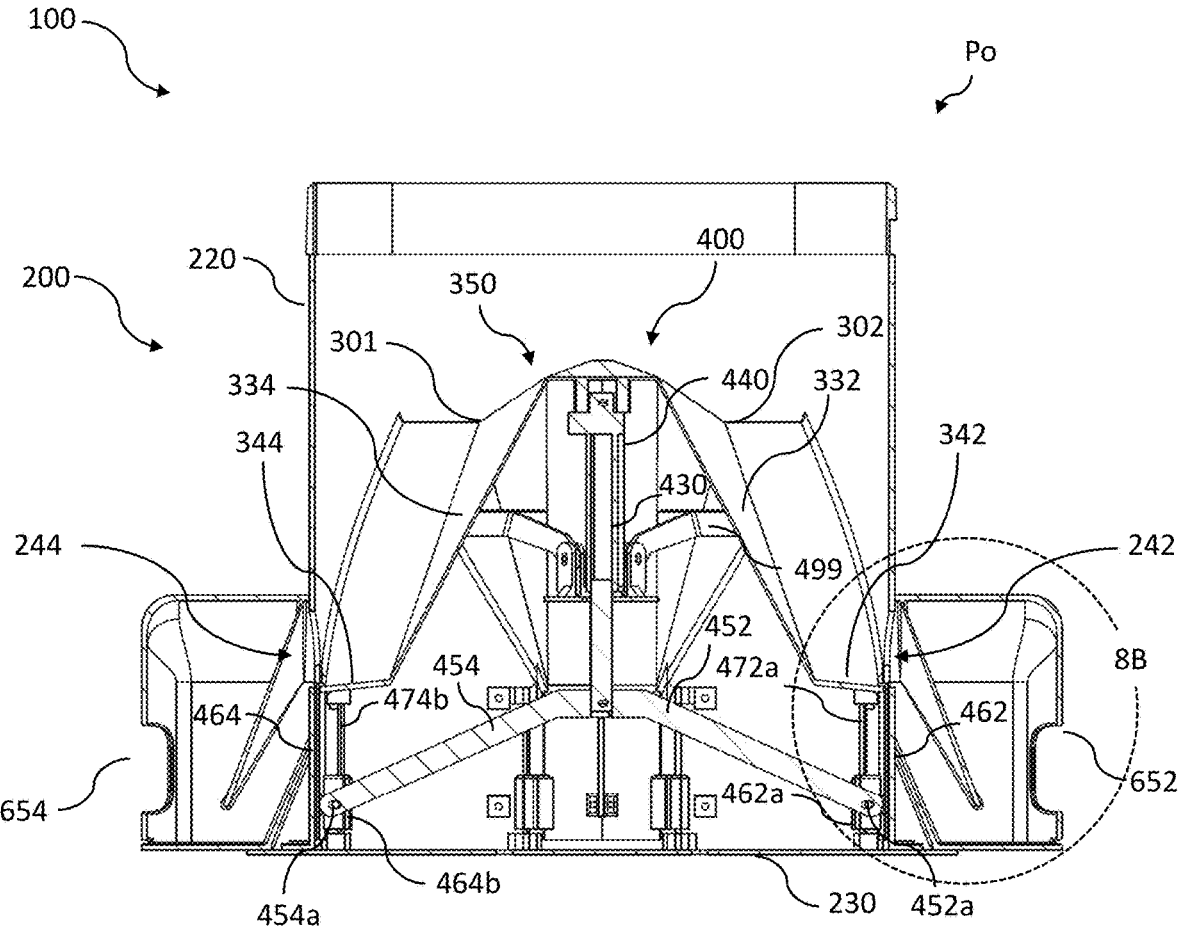
FIG. 7B is a cross-sectional view of the feeder system taken along line 7B-7B line of FIG. 7A, wherein the plurality of feed outlets are unblocked by the plurality of controllable feed gates.

FIGS. 9A-D show a linear actuator 420 in an open position, including a solenoid 440, housed within a retainer 432 and controlling an actuating piston 430. A mount 431 is shown for connecting bracket 499 of FIGS. 5B and 7B to the linear actuator 420, allowing linear actuator 420 to affix to the directing plate 350 in at least one illustrated embodiment. FIG. 9A shows a perspective view, while FIG. 9B depicts a corresponding side view, FIG. 9C a top view, and FIG. 9D a bottom view. FIG. 10 similarly depict the linear actuator of FIGS. 9A-9D in a closed position.

A feed controller is positioned within the electronic controller housing shown in FIG. 3A and is designed to control the actuator assembly 400. The feed controller may be digital or mechanical. The actuator assembly 400 is operatively connected to the feed controller to receive commands therefrom to move from an open position to a closed position. In one embodiment, the feed controller includes a timer and the feed controller is configured to activate the actuator assembly 400 in response to the timer reaching a predetermined threshold/time. For example, the timer can be programmed by a user to be in the open position at sunrise and the closed position at sunset to train animals to feed only during the day when hunting is permitted by local ordinances, rules and/or regulations. The timer may be programmed with any opening/closing interval(s). The internal battery and the timer are both located within a compartment formed into or coupled to one of the end walls. In some embodiments, the actuator assembly 400 is accessible by removing an access panel to allow for manual release of the actuator assembly. The feed controller in some embodiments also includes a switch, located either within or on the housing that can be activated by the user to operate the actuator assembly. Alternatively, a switch is located remote from, but in close proximity to, the feeder system 100 such the user can operate the actuator assembly.

Additionally or alternatively, said feed controller may be able to communicate with wireless devices and may have a sensor assembly including at least one sensor. The feed controller includes a processor, a memory storage device, and circuitry. The processor is configured to execute commands to control operation of the actuator assembly 400 in response to one or more user inputs and/or sensor inputs from the sensor assembly. The memory storage device is coupled communicatively to the processor and stores instructions that are executable by the processor. The circuitry interconnects each of the components of the controller, the sensor assembly, and the actuator assembly 400 to allow the communication of commands and/or data there between. The controller also includes one or more transceivers and/or antennas to allows wireless communication with at least one remote device such as a smart phone, computer, tablet or remote control utilized by one or more users to provide operating inputs to the feeder 100.

The feed controller may activate the actuator assembly 400 in response to one or inputs from the user's remote device, such as the user's mobile device via Bluetooth, Wi-Fi, RFID, 3G, 4G, 5G, or other connection to a mobile device or internet capable computing device. The user inputs can include a command to open or close at least one of the gates from a remote location. The user inputs can include an input setting a specific time(s) or date (or both) that at least one of the gates opens and closes. The selected time(s) may be recorded in the memory storage device or in the timer.

The feed controller may also automatically operate the actuator assembly 400 in response to one or more sensed conditions from the sensor assembly. For example, the sensor assembly may include one or more of a photodiode, photoresistor, phototransistor, or photovoltaic light sensor to detect sunrise and sunset conditions. In response to a determination that sunrise has occurred, the feed controller may be configured to output a commend to the actuator assembly 400 to open one or more of the gates. In response to a determination that sunset has occurred, the controller may be configured to output a commend to the actuator assembly 400 to close the gates. The sensor assembly may include a motion sensor and the controller may open one or more gates or close the gates in response to sensed motion, or lack thereof, around the feeder 100.

In another example, the sensor assembly includes at least one camera that takes still pictures and/or video of the desirable, preferred animal DPA that has triggered the sensor assembly to operate the actuator assembly 400 to displace the gates between the closed position $P_C$ and the open position $P_O$. The camera of the sensor assembly takes still pictures and/or video of the desirable, preferred animal DPA as it is consuming feed from the feeder 100, as well as images of the DPA approaching and departing the feeder 100. These images of the DPA include a location, date and time stamp, which are then stored in the memory storage device as an "Alert Event." The controller, namely the transceiver and the antenna, transmit an "Alert" to the user's remote device along with the Alert Event details and any pictures and/or video of the desirable, preferred animal DPA.

The sensor assembly may include one or more weather-related sensors (i.e. a barometer, rain gauge, temperature sensor, humidity sensor, etc.) and the controller may open one or more gates in response to favorable weather (i.e. no rain) or close the gates in response to unfavorable weather (i.e. rain). As one example, if these weather-related sensors detect rain or high humidity conditions, then the controller operates the actuator assembly 400 to move the gates from the open position $P_O$ to the closed position $P_C$, which can include overriding instructions stored in the memory device remain in the open position $P_O$, due to the inclement weather, thereby preventing feed from being damaged by the water or humidity. Information from a database related to weather may be sent to the feed controller such that it may selectively operate the actuator assembly 400 in response to the information.

In some embodiments, a feed controller can distinguish between a plurality of types of feed contained in separate chambers of the reservoir 220 (not shown), and in at least some embodiments the separate types of feed can be individually actuated by the feed controller such that different varieties of feed are available according to a user's preference.

C. Alternative Embodiment

Figure 11:
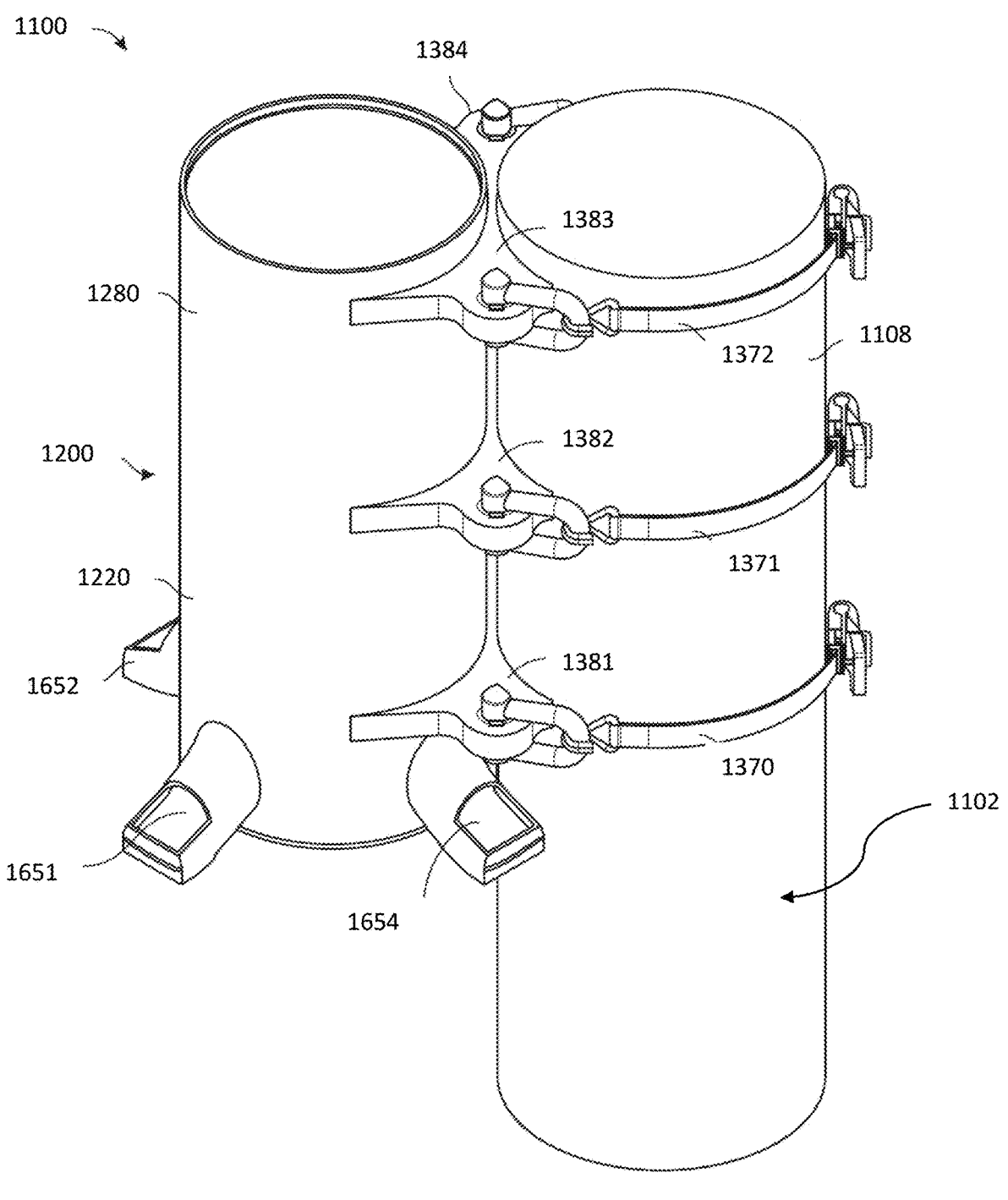
FIG. 11 is a perspective view of an alternative embodiment of the feeder system of FIG. 1A.

Consistent with such contemplations of mounting mechanisms and bracket geometries, an additional exemplary embodiment of a feeder system 1100 is depicted in FIG. 11, whereby feeder system 1100 is equipped a plurality of brackets 1381, 1382, 1383, 1384, 1385 (not shown) and 1386 (not shown) which are affixed to straps 1370, 1371, and 1372 that secure feeder system 1100 to a different external support structure 1102 in the form of a support offset from the axis of housing 1200 and feed reservoir 1220. While a feed lid 1221 (not shown) is not depicted in this embodiment, it is contemplated that such feed lid 1221 is compatible with this embodiment as with other embodiments of the disclosure for at least the advantages of preventing incursion of moisture, bacteria, fungus, sunlight, and animals such as squirrels.

D. Universal Feeder

Figures 12A, 12B, 12C, 12D:
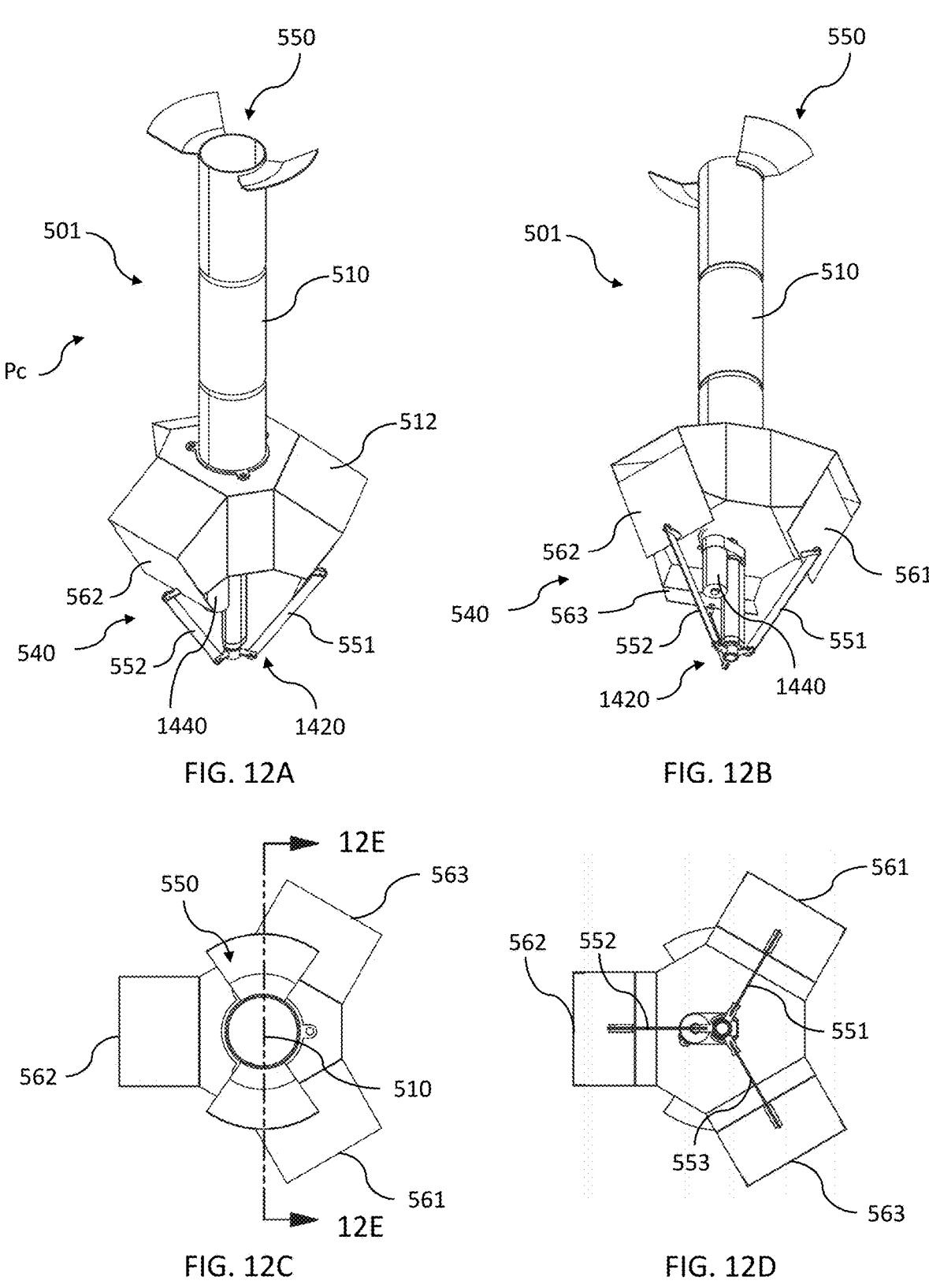
FIG. 12A is a top perspective view of a first embodiment of an universal feeder system that is configured to be affixed to an existing reservoir, and wherein said universal feeder system includes a mounting flange, feed flow system, and feed distribution system, where the feed gates are in the closed position.
FIG. 12B is a bottom perspective view of the universal feeder system of FIG. 12A, wherein the feed gates are in an intermediate position between the open position and a closed position.
FIG. 12C is a top view of the universal feeder system of FIG. 12A.
FIG. 12D is a bottom view of the universal feeder system of FIG. 12A.
Figure 12E:
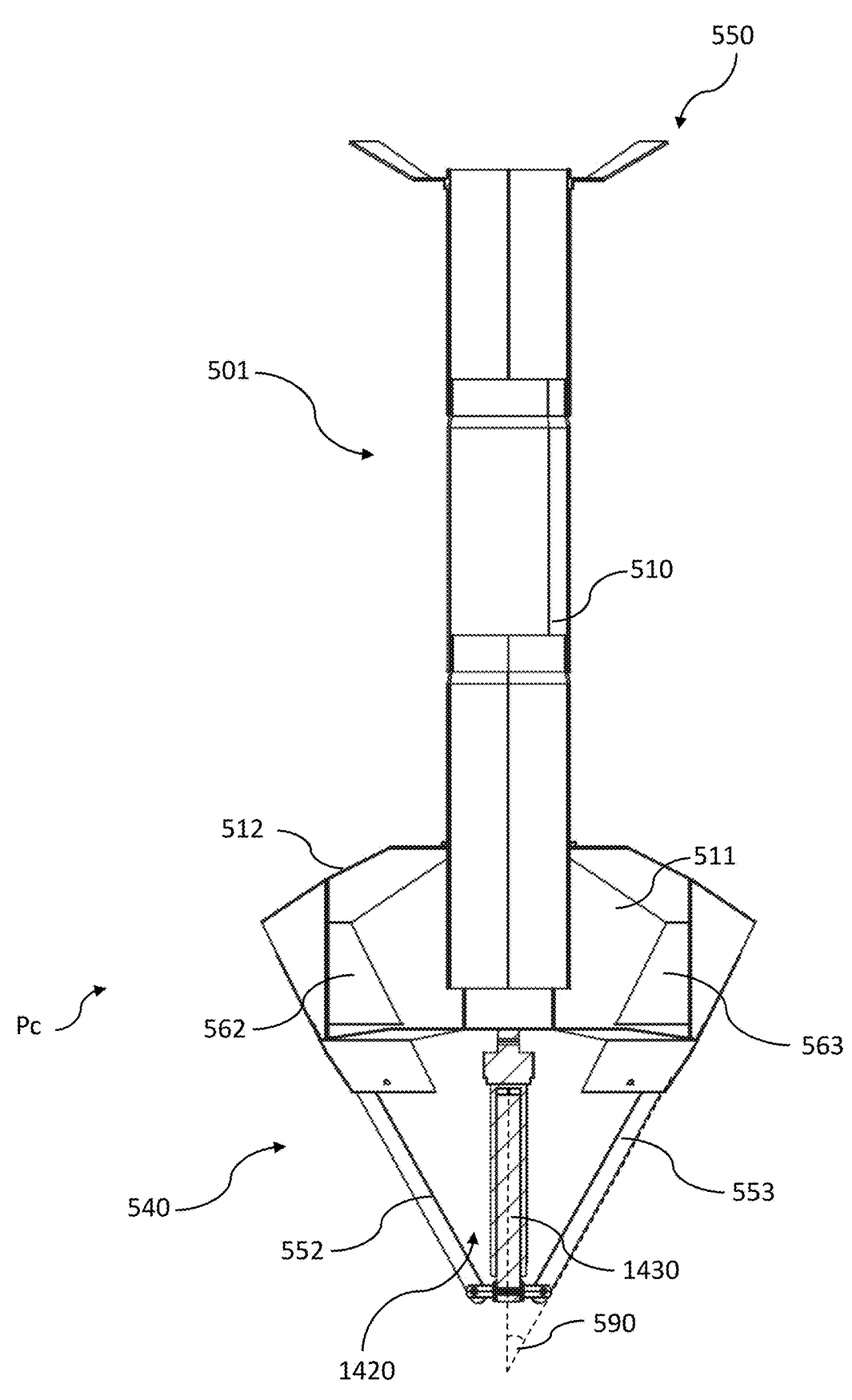
FIG. 12E is a cross-sectional view of the universal feeder system taken along line 12E-12E of FIG. 12C.

In other embodiments, a universal feeder system such as universal feeder system 501 or universal feeder system 701 is configured to independently operate to attach to an existing reservoir, moving feed from the existing reservoir out to a plurality of actuated feed gates such as 561, 562, 563, 761, 762, 763, and 764. Universal feeders for attachment to preexisting reservoirs offer several advantages of the above feeder system, with the added flexibility of adapting to existing infrastructures with feeding potential. Universal feeder assemblies 501 and 701 according to some embodiments are depicted from several views and in a variety of states thorough FIGS. 12A-E, 13A-D, and 14A-B. At FIG. 12A, an upper perspective view of a universal feeder system 501 is shown. In universal feeder system 501, a receiver point 550 mounted at the top of vertical hopper 510 is configured to attach to a plurality of existing reservoirs. In the illustrated embodiments, vertical hopper 510 above lower hopper 512, thus any feed within vertical hopper 510 automatically flows to lower hopper 512 in a gravity driven system. Universal feeder system 501 has an actuator assembly 1400 having a linear actuator 1420 operated by solenoid 1440, an actuating piston 1430, connecting arms 551, 552, and 553 along with feed gates 561, 562, and 563. In the embodiment of FIG. 12A, the actuator and corresponding gates are depicted in a closed positon, while in the lower perspective view of FIG. 12B these components are depicted in a partially open position.

In operation, a universal feeder 501 allows feed contained in a preexisting reservoir to be dispensed. A receiver flange 550, acting as a mounting mechanism, allows the preexisting reservoir to dispense feed through vertical hopper 510 and thus into lower hopper 512. Other mounting mechanisms are contemplated by this disclosure, including threaded and latching mechanisms for securing a universal feeder 501 to the underside of an existing reservoir, such as a barrel, feed bag, or other container for housing feed to be dispersed.

In the present embodiment depicted, vertical hopper 510 acts as a feed flow assembly, allowing feed to migrate to a feed distribution assembly in the form of lower hopper 512 and its corresponding feed gates 561, 562, and 563, which provide access to an internal chamber 511 of lower hopper 512 which contains feed prior to dispersion. Feed gates 561, 562, and 563 are shown in cooperation with corresponding openings of hopper 512, and in FIG. 12A are shown in the closed position. FIG. 12B shows a lower perspective view of the universal feeder 501 of FIG. 12A, however in FIG. 12B actuator arms 551, 552, and 553 are articulated by linear actuator 1420 as part of an actuator assembly 540.

When feed gates 561, 562, and 563 are in the open position, feed can be dispensed from lower hopper 512 to be consumed by deer or other animals. In operation of the embodiment shown at FIGS. 12A-E, a linear actuator 1420 manipulates feed gates 561, 562, and 563 about an axis of the feed gates, said axis at an angle 590 of less than 45 degrees to an axis of gravitational potential change, an axis of linear actuator 1420, an axis of vertical hopper 510, or combinations thereof. In some embodiments of a universal feeder (not shown), a horizontal actuator assembly moves a feed gate mounted upstream of the lower hopper. In some embodiments, the feed gate can be mounted in various locations of a vertical hopper.

Turning next to the embodiment of a universal feeder 701 shown in FIGS. 13A-D (in the closed position) and 14A-B (in the open position), a lower perspective view of a universal feeder 701 according to at least one embodiment is shown in FIG. 13A. Universal feeder 701 includes a vertical hopper 710, which acts a feed flow assembly, allowing feed to migrate to a feed distribution assembly in the form of lower hopper 712 and its corresponding feed gates 761, 762, 763, and 764, which provide access to an internal chamber 711 as depicted in FIG. 13D of lower hopper 712 which contains feed prior to dispersion. Feed gates 761, 762, 763, and 764 are controlled by, and part of, an actuator assembly 740, which includes linear actuator 2420 and a plurality of actuator arms 751, 752, 753, and 754 for actuating feed gates 761, 762, 763, and 764. In the embodiment of FIGS. 13A-D, feed gates 761, 762, 763, and 764 are in the closed position, such that feed contained in internal chamber 711 of lower hopper 712 is not dispersed though feed gates 761, 762, 763, and 764. By contrast, FIG. 14A shows each of feed gates 761, 762, 763, and 764 in an open position, along with linear actuator 2420 of actuator assembly 740. FIG. 14B shows a side view of the same, providing a view to internal chamber 711 of lower hopper 712. In operating the actuator assembly 740 between the open position and the closed position, the linear actuator 2420, and feed gates 761, 762, 763, and 764, operate along the axis of gravitational potential change, along the axis of the linear actuator 2420, and along the axis of the feed gates 761, 762, 763, and 764.

Universal feeders 501 and 701 are not limited to the particular geometries disclosed herein. For instance numbers and configurations of feed gates, numbers and configurations of feed flow assemblies and corresponding mounting mechanisms, and corresponding geometries of feed distribution assemblies including lower hoppers such as depicted in universal feeders 501, and 701, can vary without departing from the scope of the present disclosure. According to at least some embodiments, a single feed gate, two feed gates, three feed gates, five feed gates, and other configurations of feed gates corresponding to the geometry of a feed distribution assembly such as a lower hopper are contemplated herein. Further, feed flow assemblies need not be vertically oriented as shown, nor need they be essentially cylindrical as shown.

In at least some embodiments, an actuator assembly is powered by a power source. The power source in at least some embodiments is an internal battery so that the feeder system can be placed in remote locations where grid power is not available. In other embodiments, the actuator assembly may be powered by a separate power source such as a power cord connected to an electrical outlet or a generator. The feeder system may further include a solar panel coupled to the lid, for example, and that is configured to power and recharge the internal battery power source. According to at least some embodiments, a feeder system or universal feeder can be crafted from plastics, metals, corrugated materials, woods, and/or synthetic materials. It should also be understood that all aspects of the daytime animal feeder disclosed within WO2023147062 may be used in connection with the disclosed system 100, and as such WO2023147062 is incorporated herein by reference for all purposes.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure. It is to be understood that the invention is not limited to the exact details of construction, operation, exact materials or embodiments shown and described, as obvious modifications and equivalents will be apparent to one skilled in the art. Accordingly, the invention is therefore to be limited only by the scope of the appended claims. While the specific embodiments have been illustrated and described, numerous modifications come to mind without significantly departing from the spirit of the invention, and the scope of protection is only limited by the scope of the accompanying Claims.

The invention claimed is:

1. A feeding system for dispensing animal feed, comprising:

a housing disposed about a housing axis, the housing having at least one sidewall;

a plurality of feed outlets in communication with the housing;

a feed reservoir within the housing;

wherein a lower bound of the feed reservoir is defined by a directing plate, the directing plate in communication with a first feed outlet of the plurality of feed outlets;

an actuator assembly residing within the housing;

wherein the actuator assembly includes a linear actuator having a linear actuator axis, a plurality of gates, and a plurality of connecting arms affixing the linear actuator to the plurality of gates;

wherein a first gate is positioned parallel to the linear actuator axis, and normal to the first feed outlet;

wherein the first gate can be actuated between an open position and a closed position by the linear actuator, and the first gate prevents feed in the feed reservoir from moving from the reservoir to the first feed outlet in the closed position.

2. The feeding system of claim 1, wherein in the open position, the first gate allows feed in the feed reservoir to move from the reservoir to the first feed outlet.

3. The feeding system of claim 1, wherein the linear actuator is axis is parallel to the housing axis during movement of the actuator assembly between the open position and the closed position.

4. The feeding system of claim 1, wherein in the open position, the entire first gate extends below the first feed outlet.

5. The feeding system of claim 1, wherein the directing plate includes at least one feed distribution channel, wherein a first distribution channel of the directing plate is in communication with the first feed outlet.

6. The feeding system of claim 1, wherein the plurality of feed outlets includes a second feed outlet, wherein the directing plate is in communication with the second feed outlet.

7. The feeding system of claim 6, wherein a second gate is positioned parallel to the linear actuator axis, the second gate can be actuated between an open position and a closed position by the linear actuator, the second gate is positioned normal to the second feed outlet, and the second gate is in the open position when the first gate is in the open position.

8. The feeding system of claim 6, wherein the plurality of feed outlets includes a third feed outlet, wherein the directing plate is in communication with the third feed outlet.

9. The feeding system of claim 8, wherein a third gate is positioned parallel to the linear actuator axis, the third gate can be actuated between an open position and a closed position by the linear actuator, the third gate is positioned normal to the third feed outlet, and the third gate is in the open position when the first gate is in the open position.

10. The feeding system of claim 8, wherein the plurality of feed outlets includes a fourth feed outlet, wherein the directing plate is in communication with the fourth feed outlet.

11. The feeding system of claim 10, wherein a fourth gate is positioned parallel to the linear actuator axis, the fourth gate can be actuated between an open position and a closed position by the linear actuator, the fourth gate is positioned normal to the fourth feed outlet, and the fourth gate is in the open position when the first gate is in the open position.

12. The feeding system of claim 1, wherein an upper bound of the feed reservoir is defined by a lid, and at least one additional bound of the feed reservoir is defined by the at least one sidewall of the housing.

13. The feeding system of claim 1, wherein the directing plate comprises one distribution channel for each feed outlet of the plurality of feed outlets, wherein:

each distribution channel terminates at an upper end positioned parallel to a first position along the housing axis;

each distribution channel further terminates at a feed outlet parallel to a second position along the housing axis.

14. The feeding system of claim 13, wherein each distribution channel features a first distribution surface meeting a second distribution surface at an obtuse angle, and wherein the first distribution surface and the second distribution surface are symmetrical within each distribution channel.

15. The feeding system of claim 1, wherein a plurality of external feed chambers are affixed to the housing, and wherein each external feed chamber corresponds to one of the feed outlets of the plurality of feed outlets.

16. The feeding system of claim 15, wherein at least one external feed chamber of the plurality of external feed chambers includes an upper external guiding surface, a lower external guiding surface, and a feed access aperture, wherein:

the upper external guiding surface terminates at an upper end positioned parallel to a first position along the housing axis;

the upper external guiding surface terminates at a lower end positioned parallel to a second position along the housing axis, where the lower end of the upper external guiding surface terminates above a lower extreme of the feed access aperture.

17. The feeding system of claim 1, wherein a distal end of the housing is capped by a floor perpendicular to the housing axis.

18. The feeding system of claim 17, wherein the first gate and linear actuator are located between the floor and the directing plate when the first gate is in the open position.

19. The feeding system of claim 18, wherein the floor comprises at least one mounting structure, the at least one mounting structure configured to receive at least one support structure.

20. The feeding system of claim 1, wherein the linear actuator is suspended from a mounting bracket affixed to the directing plate.

* * * * *